(12) United States Patent
Jensen et al.

(10) Patent No.: US 10,888,016 B2
(45) Date of Patent: Jan. 5, 2021

(54) TECHNOLOGIES FOR AUTOMATED SERVICING OF SLEDS OF A DATA CENTER

(71) Applicant: Intel Corporation, Santa Clara, CA (US)

(72) Inventors: Ralph Jensen, Hillsboro, OR (US); Michael Crocker, Portland, OR (US); Brendan Pavelek, Portland, OR (US); David Payne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 16/023,803

(22) Filed: Jun. 29, 2018

(65) Prior Publication Data

US 2019/0062053 A1 Feb. 28, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
| | |
|---|---|
| H05K 7/18 | (2006.01) |
| B25J 15/00 | (2006.01) |
| H05K 7/14 | (2006.01) |
| G06F 9/50 | (2006.01) |
| H04L 12/24 | (2006.01) |

(Continued)

(52) U.S. Cl.
CPC ........ *H05K 7/1498* (2013.01); *B25J 15/0014* (2013.01); *G06F 1/183* (2013.01); *G06F 1/20* (2013.01); *G06F 9/44* (2013.01); *G06F 9/4856* (2013.01); *G06F 9/505* (2013.01); *G06F 9/5061* (2013.01); *G06F 9/5088* (2013.01); *G06F 11/3442* (2013.01); *G06F 13/4022* (2013.01); *G06F 15/7807* (2013.01); *G06F 15/7867* (2013.01); *G06F 21/105* (2013.01); *G06Q 30/0283* (2013.01); *H04L 41/0896* (2013.01); *H04L 41/5019* (2013.01); *H04L 41/5025* (2013.01); *H04L 63/0428* (2013.01); *H04L 67/1008* (2013.01); *H05K 7/1489* (2013.01); *H05K 7/18* (2013.01); *H05K 7/20736* (2013.01); *G06F 2200/201* (2013.01);

(Continued)

(58) Field of Classification Search
CPC ............................... B25J 15/0014; H05K 7/18
See application file for complete search history.

(56) References Cited

U.S. PATENT DOCUMENTS

| | | | | |
|---|---|---|---|---|
| 5,966,266 A | * | 10/1999 | Kato | .................... G11B 17/225 360/92.1 |
| 9,363,926 B1 | * | 6/2016 | Beall | .................... G11B 33/128 |

(Continued)

*Primary Examiner* — Thomas Randazzo
(74) *Attorney, Agent, or Firm* — Compass IP Law PC

(57) ABSTRACT

Racks for operation in a data center, robots for use with racks of a data center, and methods of removing sleds from, and inserting sleds into, racks of a data center are disclosed herein. A rack includes a plurality of sled spaces and a plurality of sleds. Each sled is mounted in a corresponding sled space such that the plurality of sleds are spaced from one another in a vertical direction. A robot is configured to interface with any of the plurality of sleds mounted in the sled spaces.

23 Claims, 27 Drawing Sheets

(51) Int. Cl.
*G06F 11/34* (2006.01)
*G06F 21/10* (2013.01)
*G06Q 30/02* (2012.01)
*G06F 1/18* (2006.01)
*G06F 1/20* (2006.01)
*G06F 9/44* (2018.01)
*G06F 13/40* (2006.01)
*G06F 15/78* (2006.01)
*H05K 7/20* (2006.01)
*H04L 29/08* (2006.01)
*G06F 9/48* (2006.01)
*H04L 29/06* (2006.01)
*G06N 3/063* (2006.01)
*G06Q 10/06* (2012.01)
*H04L 12/931* (2013.01)

(52) U.S. Cl.
CPC ......... *G06N 3/063* (2013.01); *G06Q 10/0631* (2013.01); *H04L 41/14* (2013.01); *H04L 49/40* (2013.01)

(56) References Cited

U.S. PATENT DOCUMENTS

| | | | |
|---|---|---|---|
| 9,859,918 B1* | 1/2018 | Gopal | G02B 6/4452 |
| 2012/0029687 A1* | 2/2012 | Hagen | B65G 1/0407 |
| | | | 700/218 |
| 2013/0322223 A1* | 12/2013 | Minemura | G11B 33/04 |
| | | | 369/75.11 |
| 2014/0185225 A1* | 7/2014 | Wineland | H05K 7/20745 |
| | | | 361/679.31 |
| 2017/0094828 A1* | 3/2017 | Van Pelt | H05K 7/1489 |
| 2017/0102510 A1* | 4/2017 | Faw | H05K 7/1489 |
| 2017/0181306 A1* | 6/2017 | Shaw | H05K 7/1438 |
| 2018/0024578 A1* | 1/2018 | Ahuja | G06F 1/206 |
| | | | 700/300 |
| 2018/0024771 A1* | 1/2018 | Miller | H04B 10/25891 |
| | | | 711/154 |
| 2018/0152540 A1* | 5/2018 | Niell | G06F 3/0608 |
| 2018/0257183 A1* | 9/2018 | Fisher | B23P 6/00 |
| 2019/0270591 A1* | 9/2019 | Lert, Jr. | B65G 1/1378 |
| 2019/0307014 A1* | 10/2019 | Adiletta | G06F 11/079 |

* cited by examiner

TECHNOLOGIES FOR AUTOMATED SERVICING OF SLEDS OF A DATA CENTER

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

Typical enterprise-level data centers can include several to hundreds of racks or cabinets, with each rack/cabinet housing multiple servers or sleds. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional rack systems are self-contained physical support structures that include a number of pre-defined server spaces. A corresponding server or sled may be mounted in each pre-defined server or sled space. During use, the various servers or sleds mounted in a rack may require maintenance and/or periodic refreshing. In embodiments in which a data center houses a large number of racks, servicing an individual server or sled can be time consuming and cumbersome, especially for human technicians.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
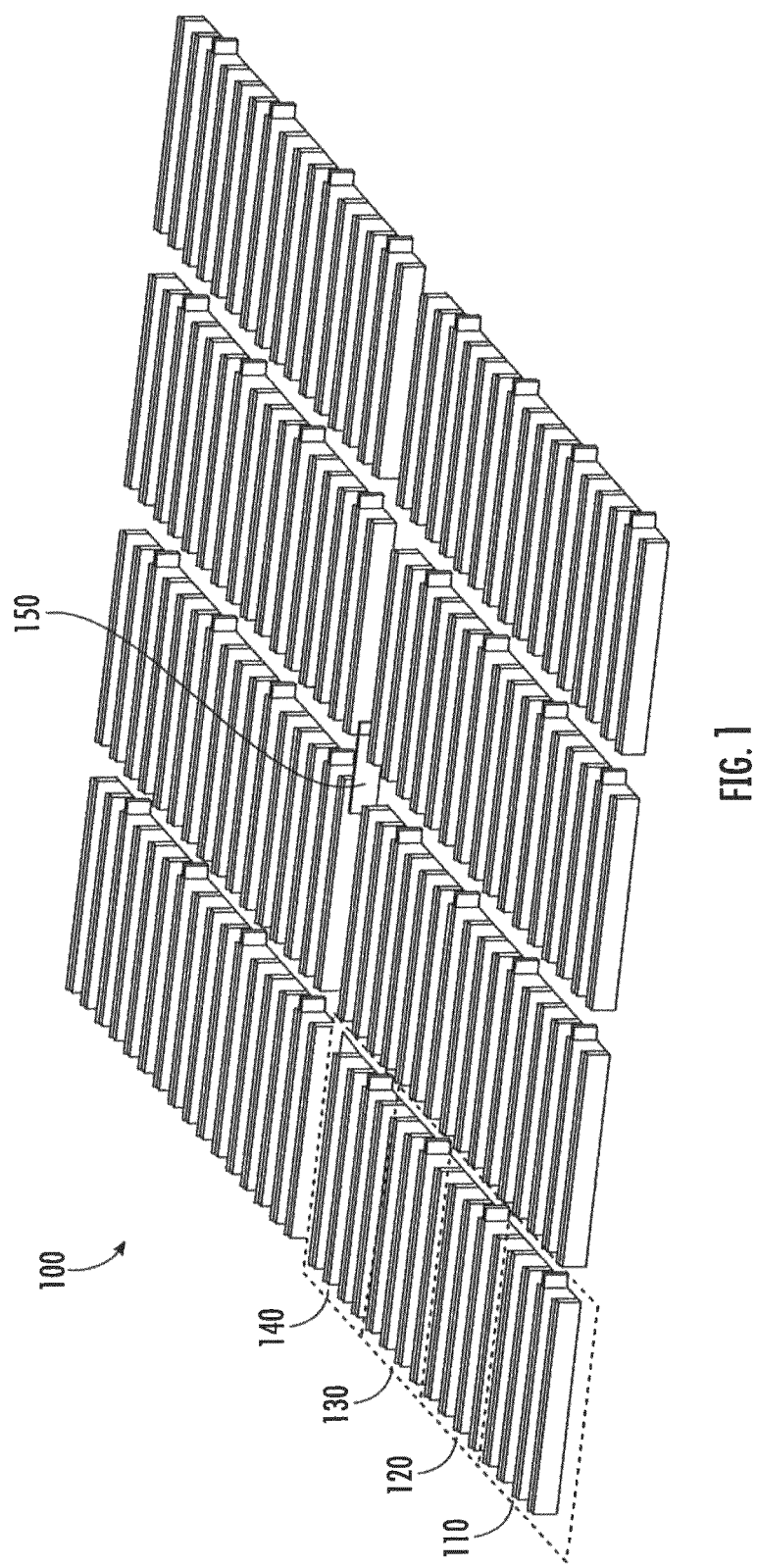
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
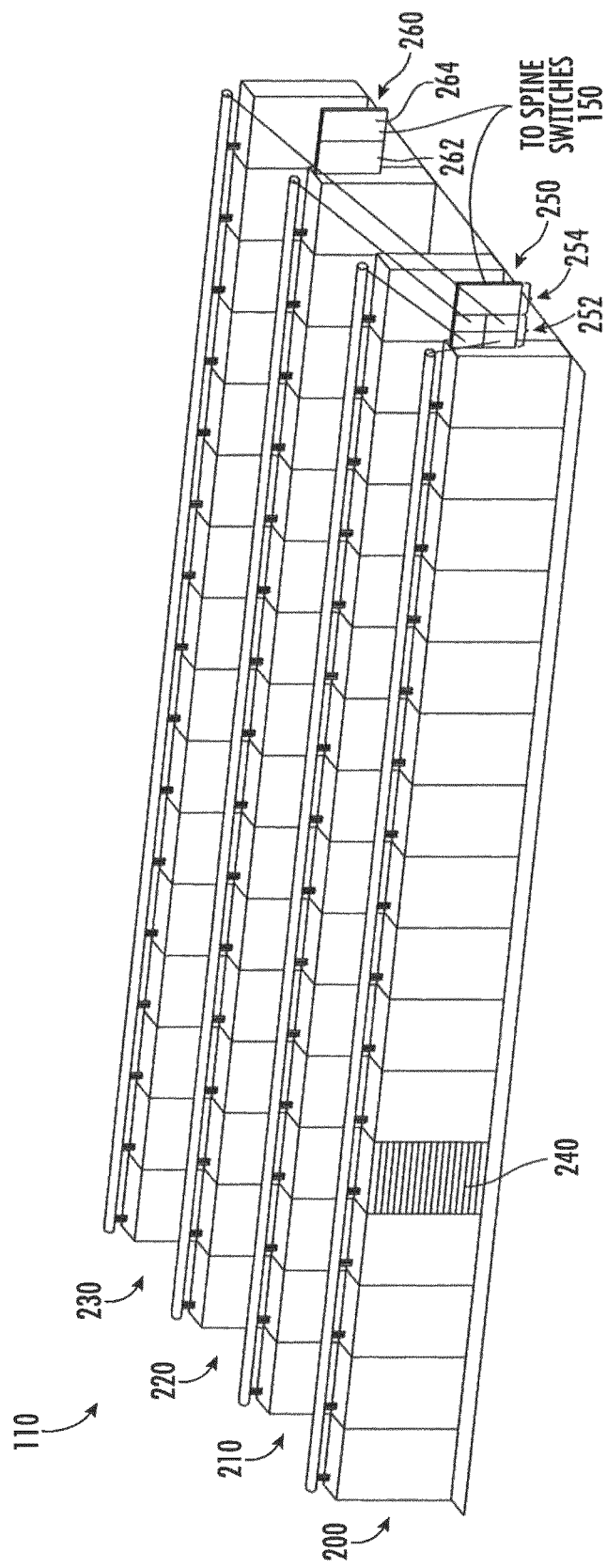
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
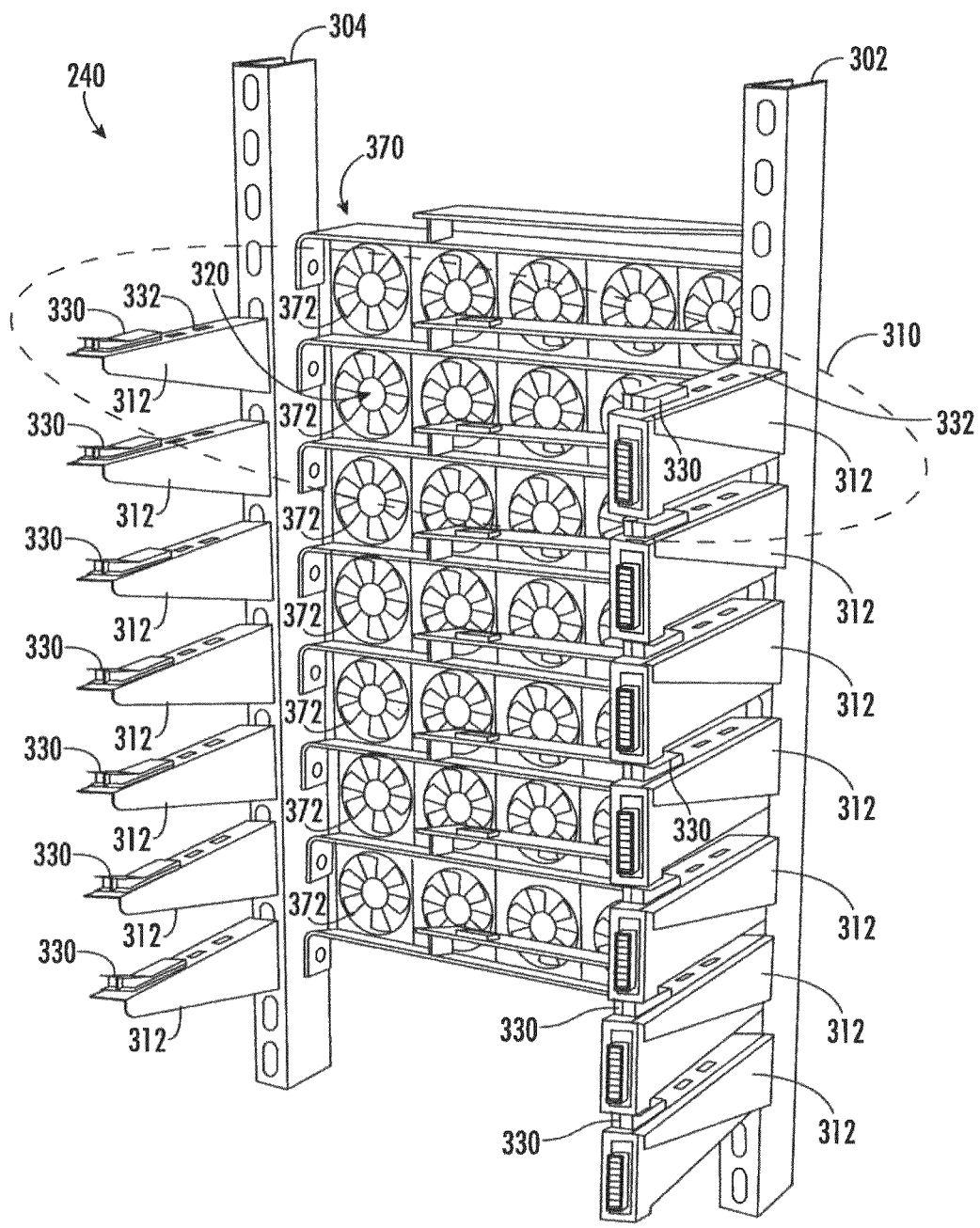
FIG. 3 is a perspective view of at least one embodiment of a rack that may be included in the pod of FIG. 2.
Figure 4:
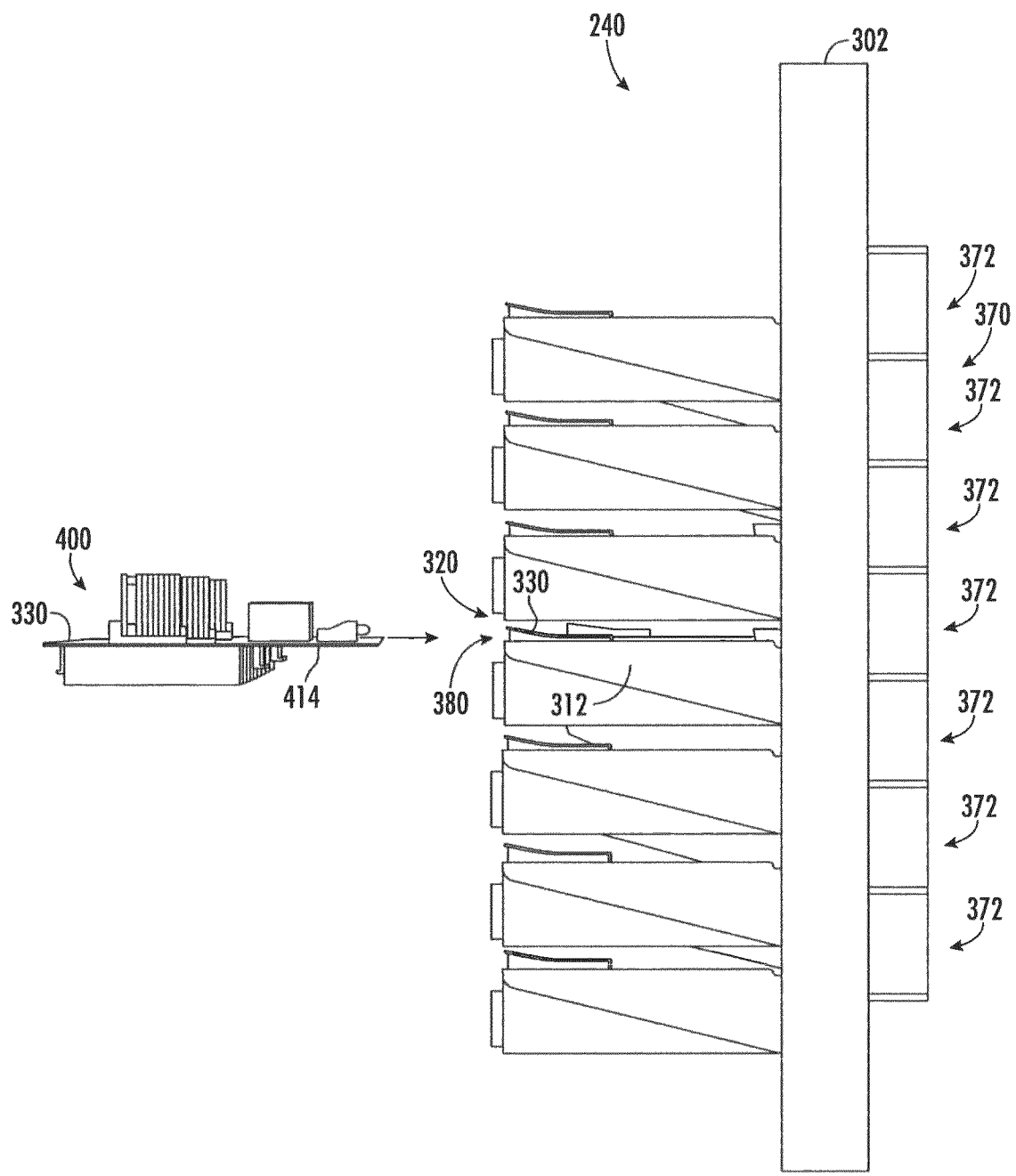
FIG. 4 is a side elevation view of the rack of FIG. 3.
Figure 5:
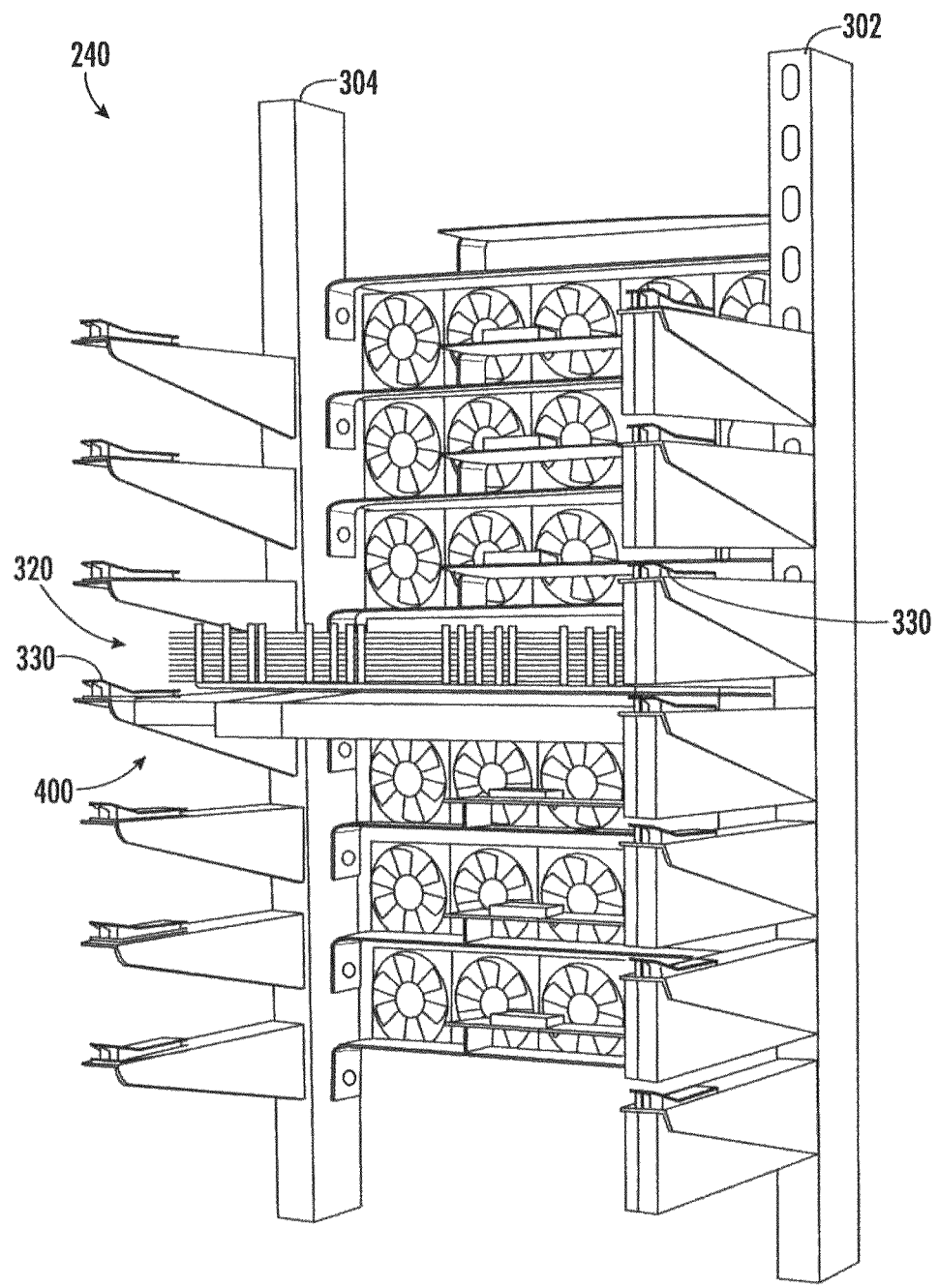
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
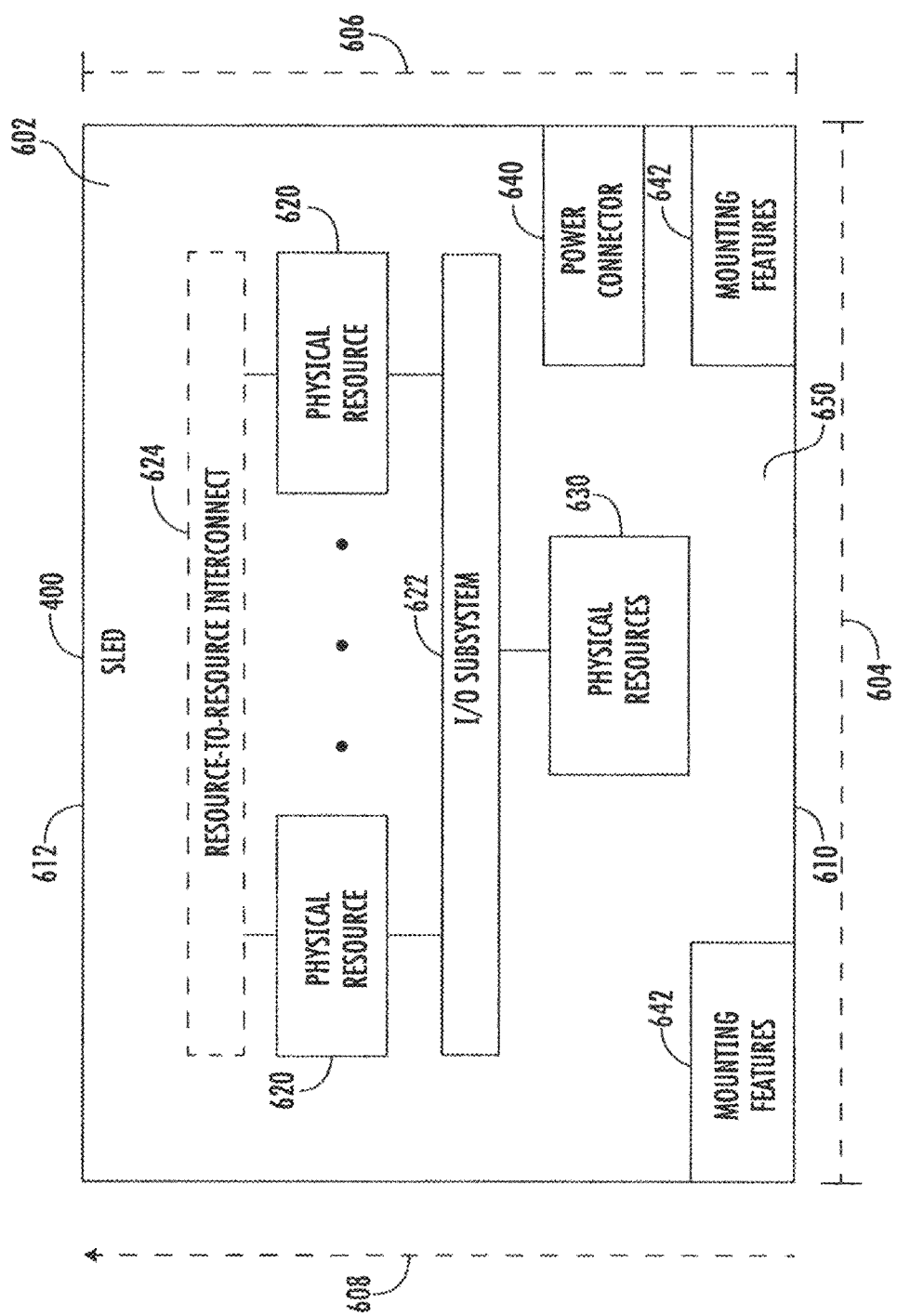
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
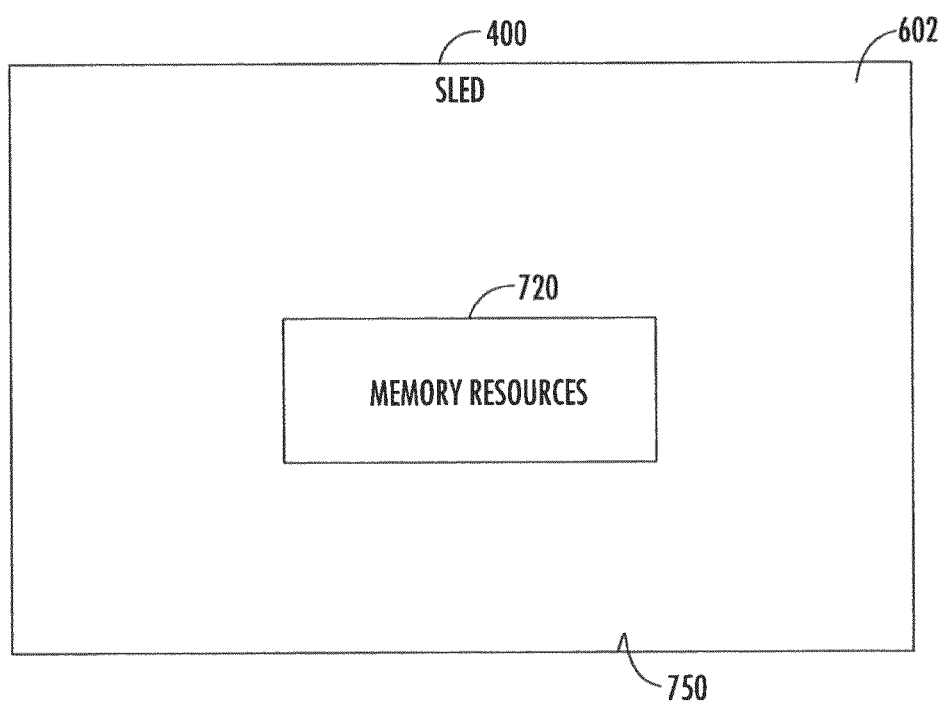
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
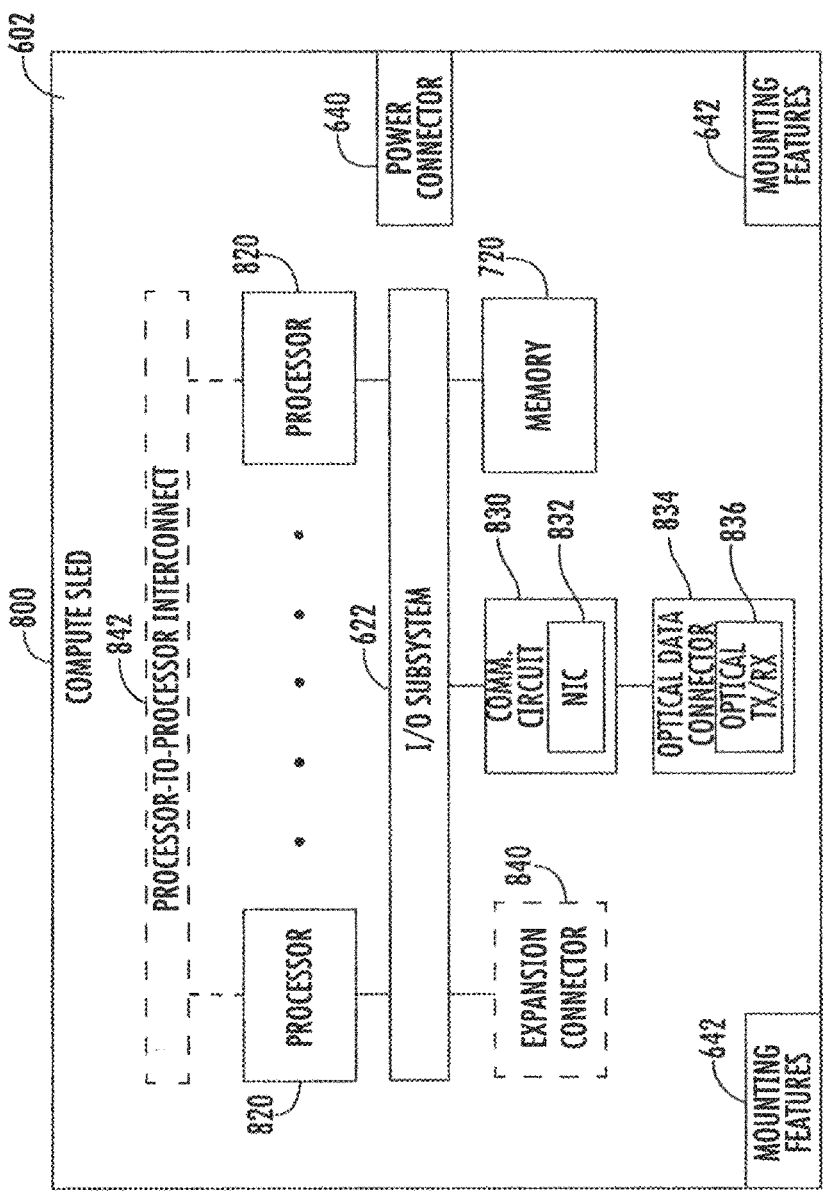
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
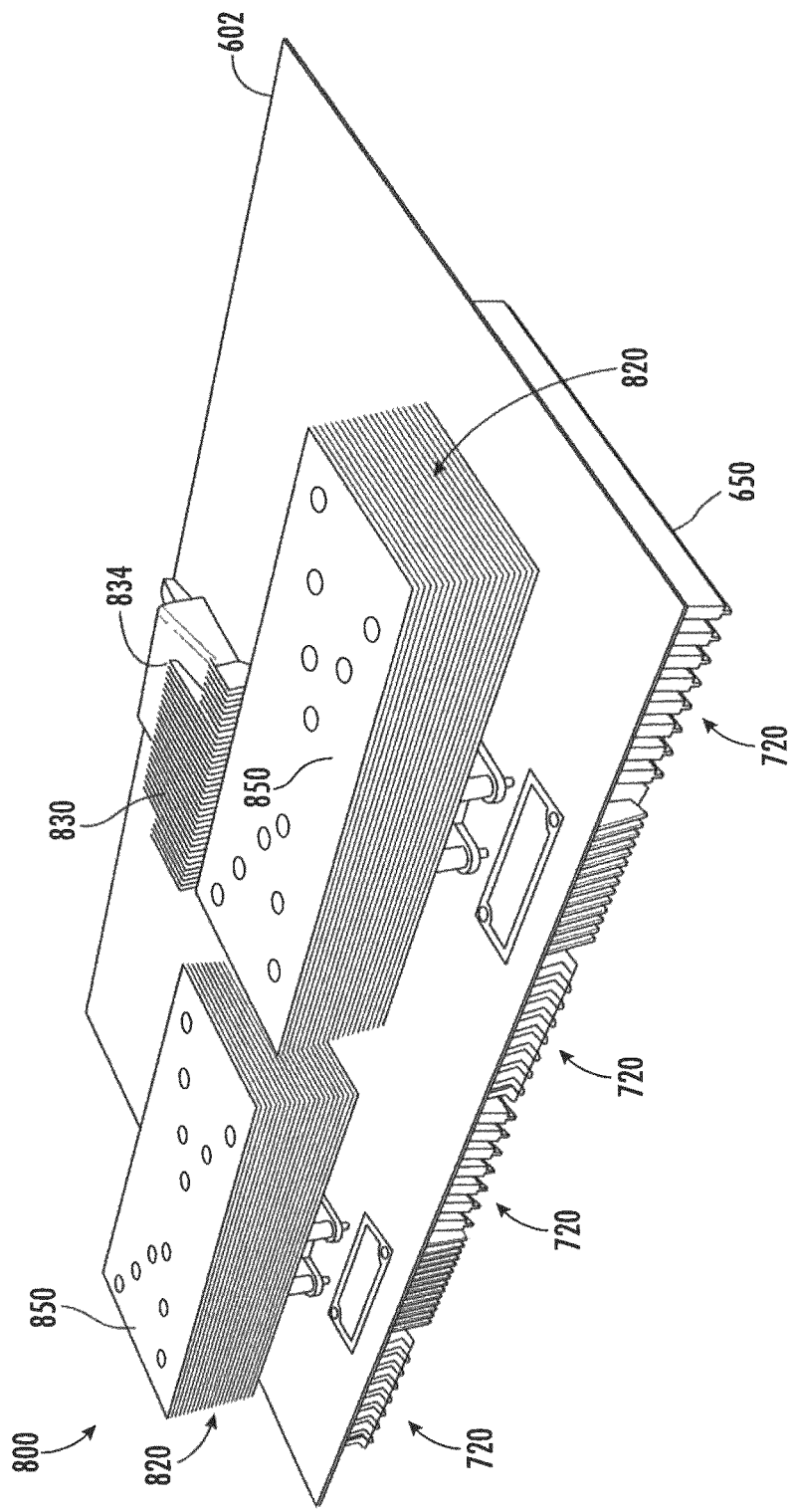
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
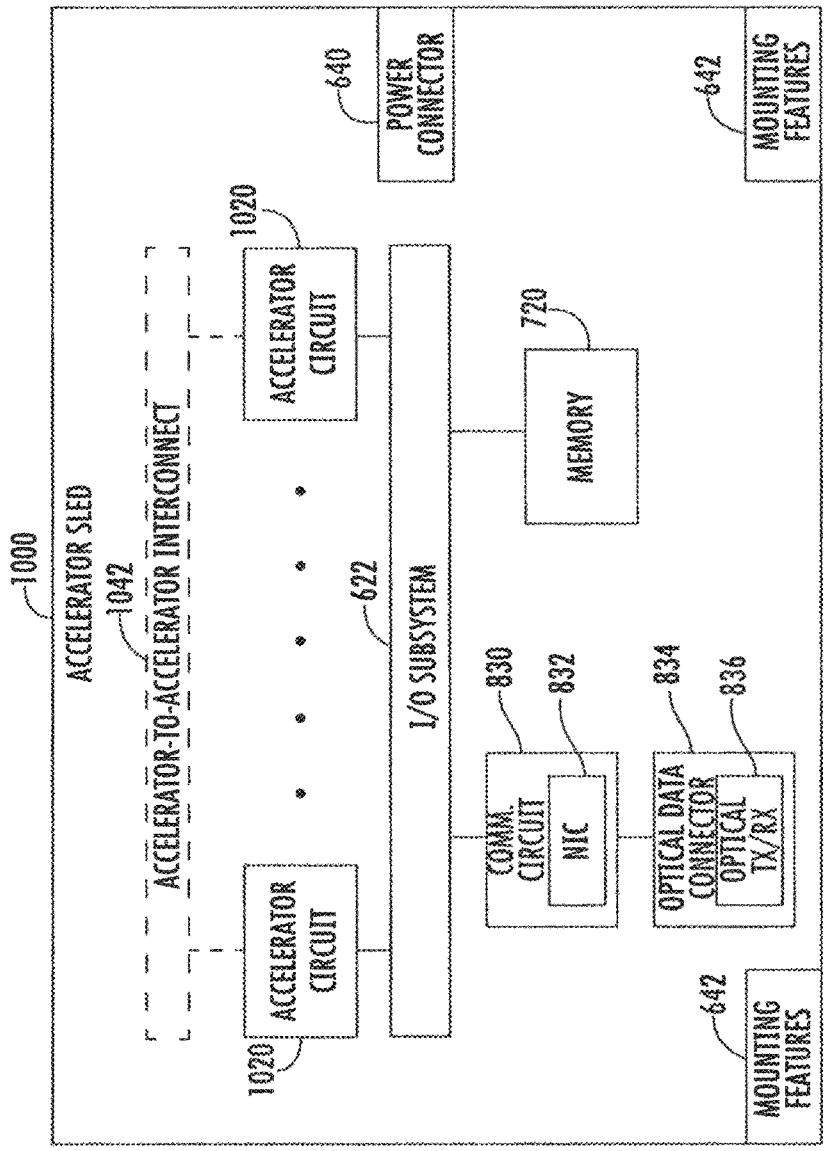
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
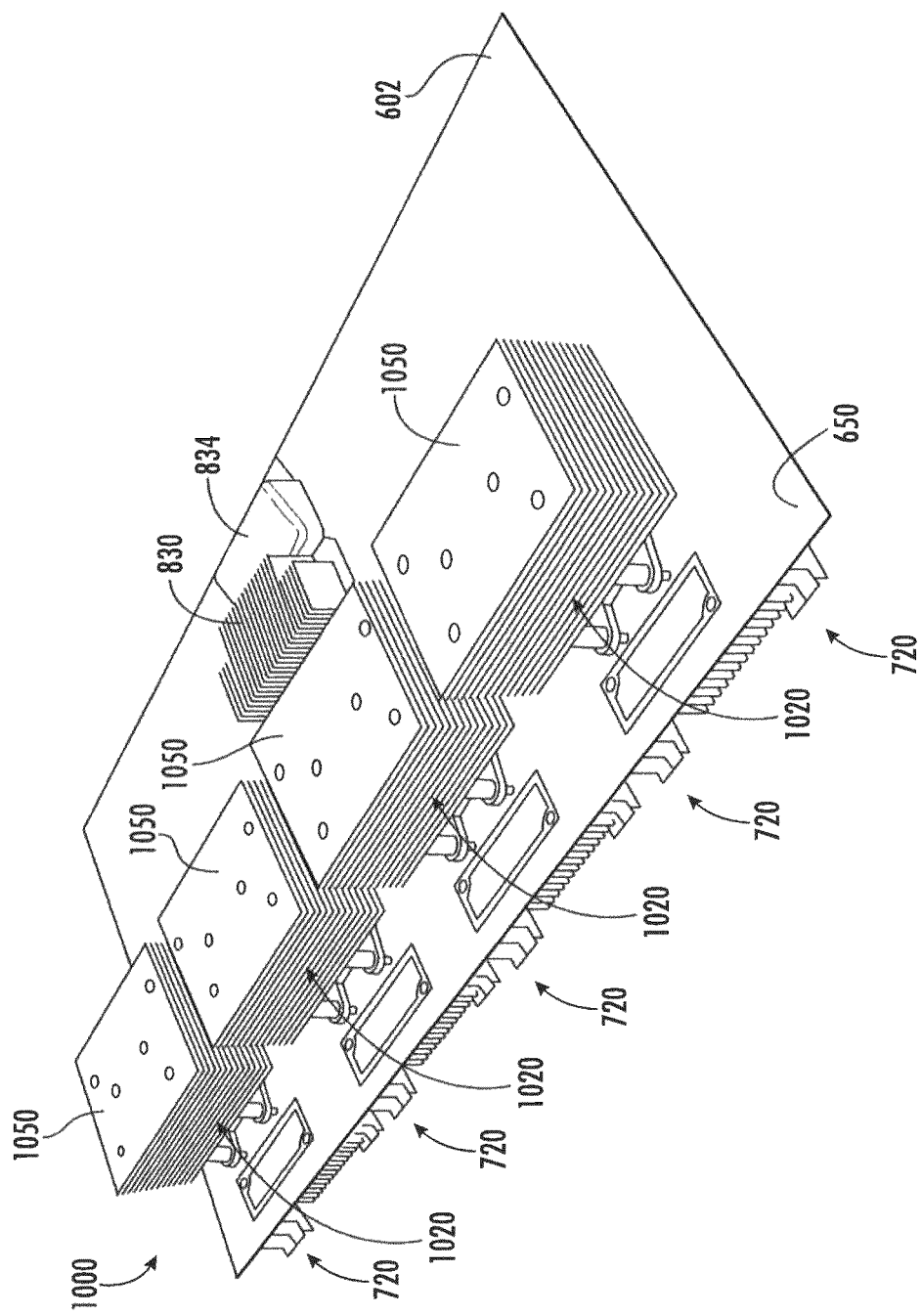
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
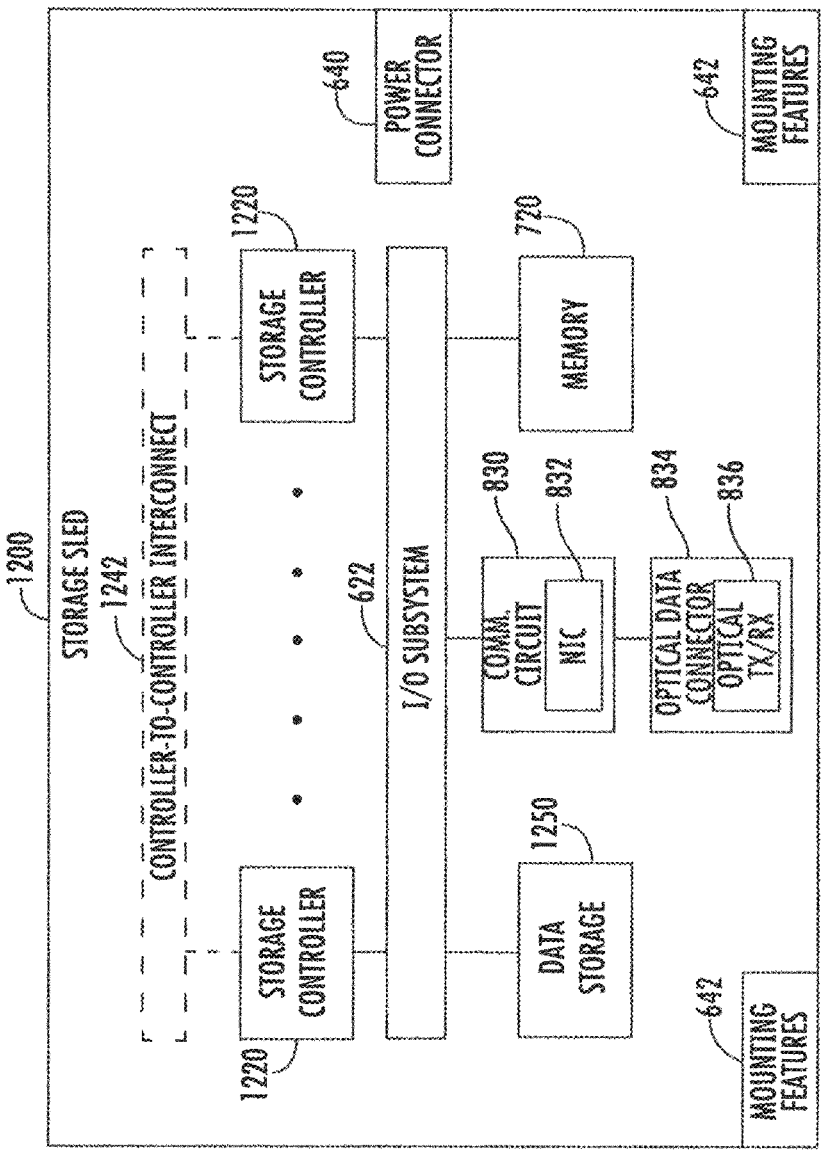
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
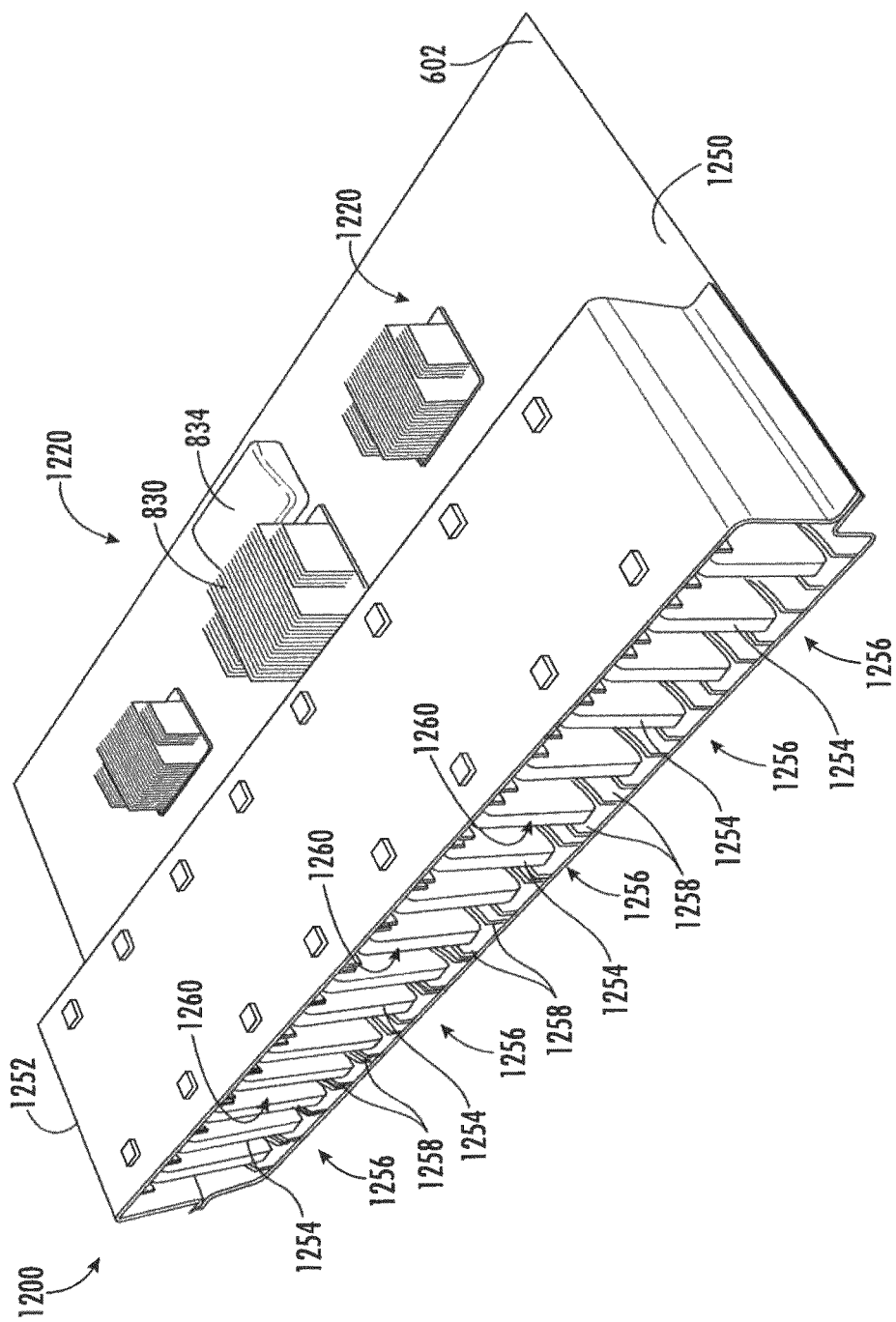
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
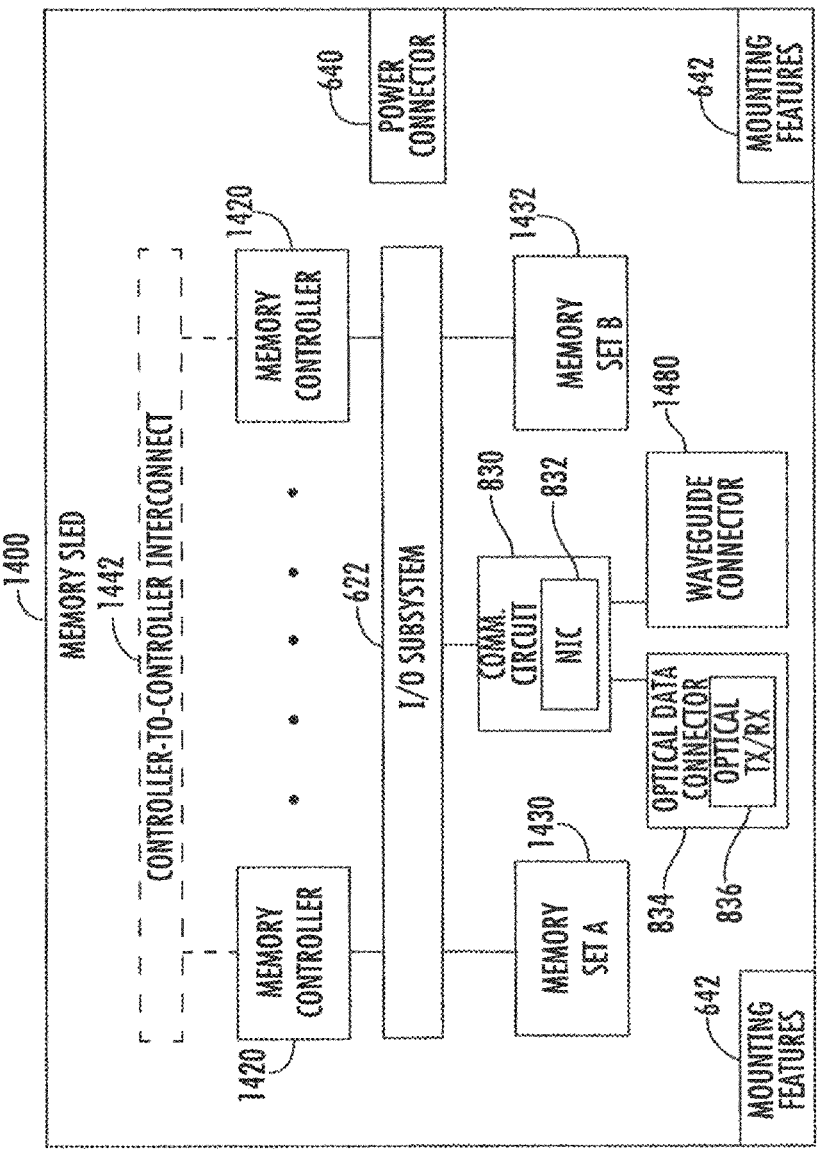
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
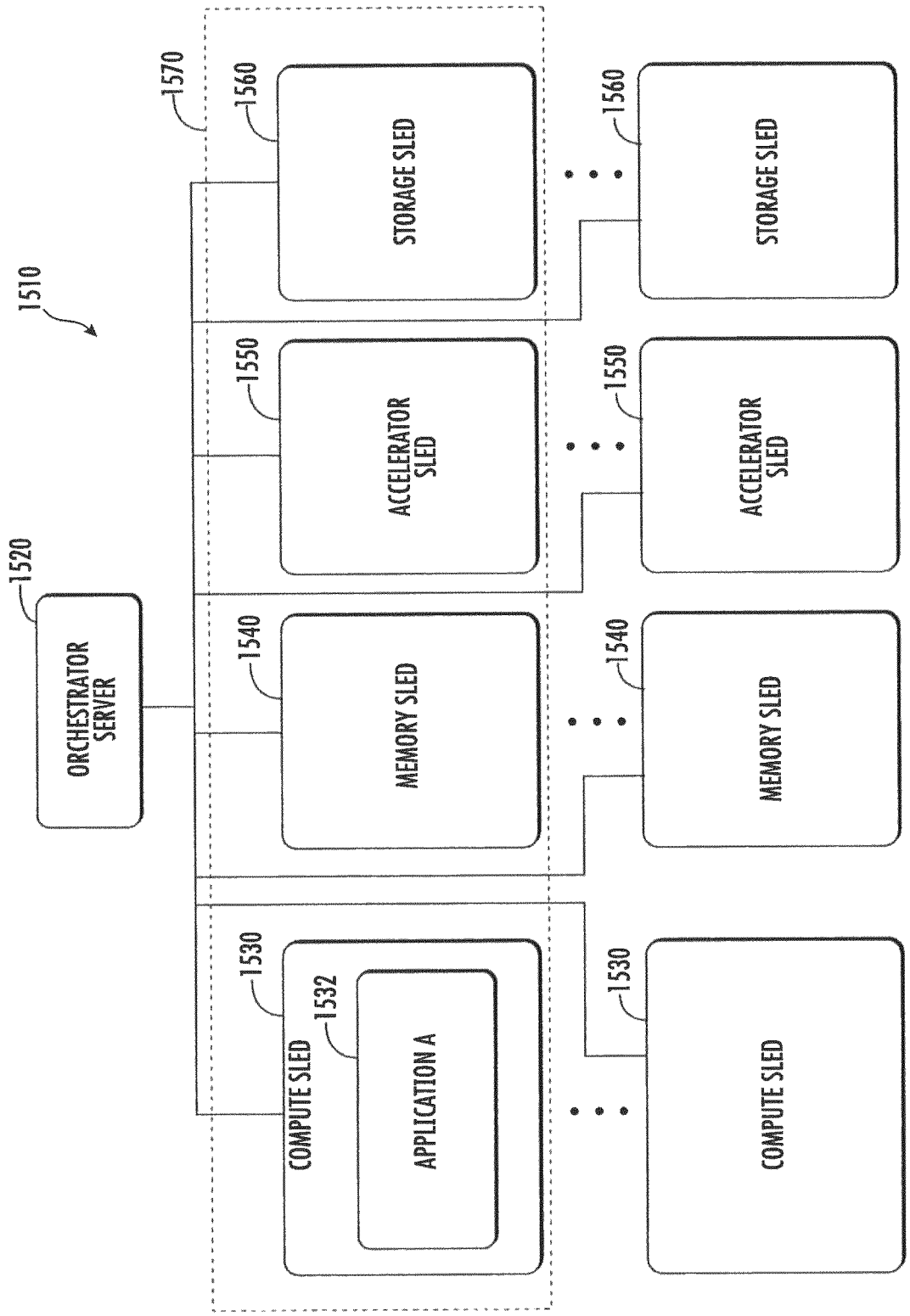
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
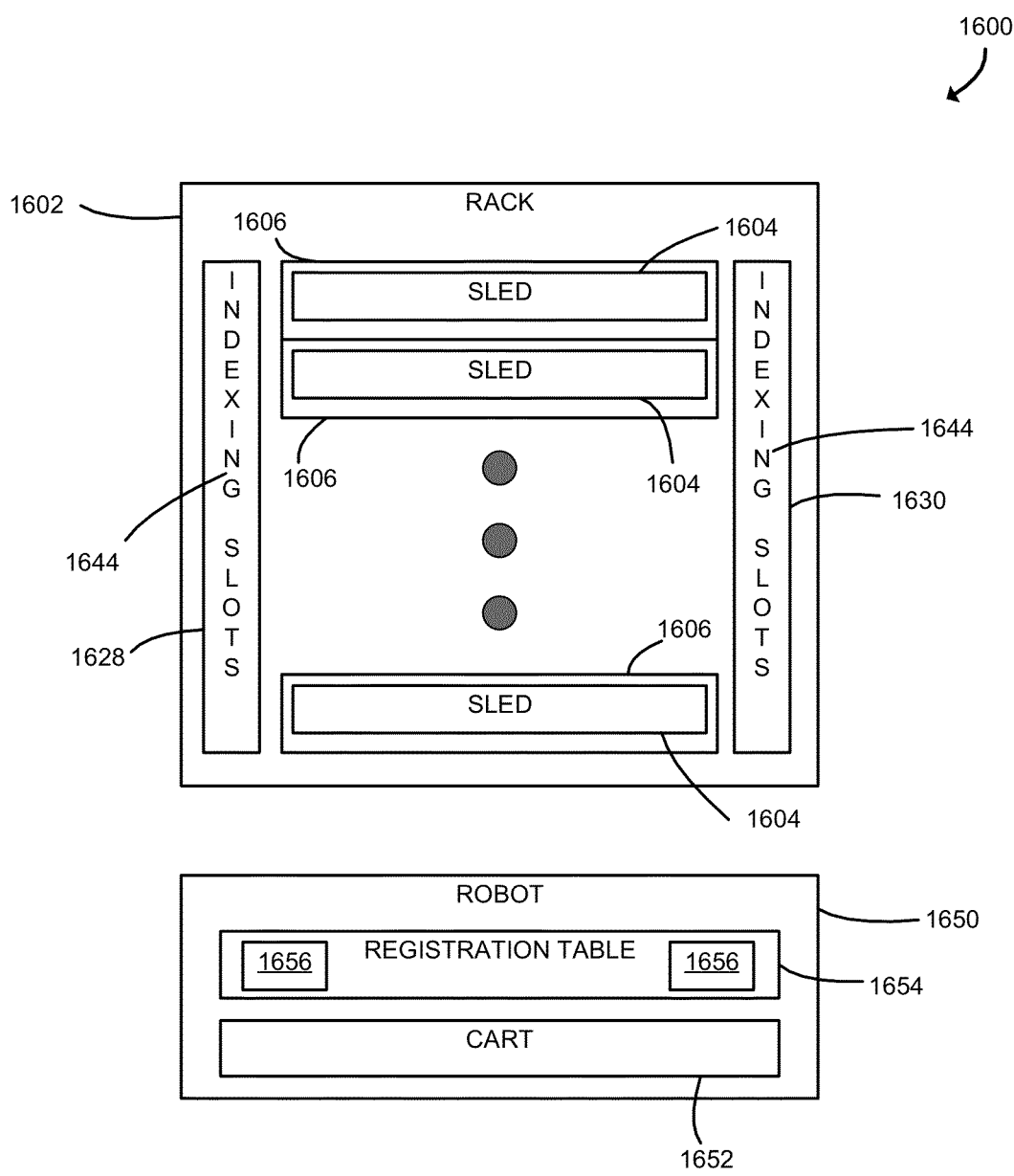
FIG. 16 is a simplified block diagram of one embodiment of a system that includes a rack and a robot.

Referring now to FIG. 16, an illustrative system 1600 for automated servicing of sleds of a data center includes a rack 1602 and a maintenance robot 1650. Similar to the rack 240 discussed above, the rack 1602 is configured to house one or more sleds 1604 in corresponding sled slots 1606 of the rack 1602. The sleds 1604 may be embodied as any type of sled supporting various physical resources, which may include processors, co-processors, accelerators, field programmable gate arrays (FPGAs), memory, storage, and/or other electrical components. For example, each sled 1604 may be embodied as a circuit board on which components such as CPUs, memory, and/or other components are mounted, depending on the type of the sled 1604. As such, each of the sleds 1604 may be similar to, or embodied as, any one of the sleds 400, 800, 1000, 1200, 1400, described above. For example, each sled 1604 may be embodied as a compute sled, a memory sled, an accelerator sled, a data storage sled, and/or other physical resource sled.

As discussed in more detail below, the illustrative rack 1602 includes various features that allow the maintenance robot 1650 to couple itself to the rack 1602 and traverse the rack 1602 in a vertical direction V to remove, install, and/or swap corresponding sleds 1604 to/from the rack 1602 in an automated fashion. In particular, the illustrative rack 1602 includes a pair of guide tracks 1628, 1630, which extend vertically along the direction V over the entirety of the sled slots 1606. Each guide track 1628, 1630 includes multiple indexing slots 1644 defined along the corresponding guide track 1628, 1630 that are configured to facilitate positional tracking of the robot 1650 as the robot 1650, or a component thereof, moves along the rack 1602 in the vertical direction V.

As discussed above, the robot 1650 is configured to couple itself to the rack 1602 and traverse the rack 1602 to access a desired sled 1604 or sled slot 1606. To do so, the illustrative robot 1650 includes a cart 1652 and a sled table 1654 that is detachably coupled to the cart 1652. In use, as discussed in more detail below, the cart 1652 is configured to traverse within a data center to a desired rack 1602 and couple the sled table 1654 to the guide tracks 1628, 1630 of the desired rack 1602. Once coupled, the sled table 1654 is supported by the rack 1602 and movable along the along the rack 1602 in the vertical direction V to a desired sled slot 1606 (e.g., to access a sled 1604 mounted therein and/or to install a sled 1604 therein). As such, the sled table 1654 may be embodied as any type of table, tray, registration device, or other device or component capable of coupling with the desired rack 1602, traversing the rack 1602 along the vertical direction V, and carrying a corresponding sled 400 as discussed in more detail below.

To that end, the illustrative sled table 1654 includes climbing gears 1656, 1658 that are configured to interact with the indexing slots 1644 of the respective guide tracks 1628, 1630 to facilitate movement of the sled table 1654 along the guide tracks 1628, 1630. When supported by the rack 1602, the sled table 1654 is movable in the vertical direction V to any of the sled slots 1606 to remove one of the sleds 1604 from the corresponding sled slot 1606 and/or install a sled 1604 (e.g., a replacement sled 1604) into the corresponding sled slot 1606. Thus, the illustrative robot 1650 is configured to robotically access and manipulate any of the sleds 1604 mounted in the rack 1602 for servicing, repair, and/or replacement.

Figure 17:
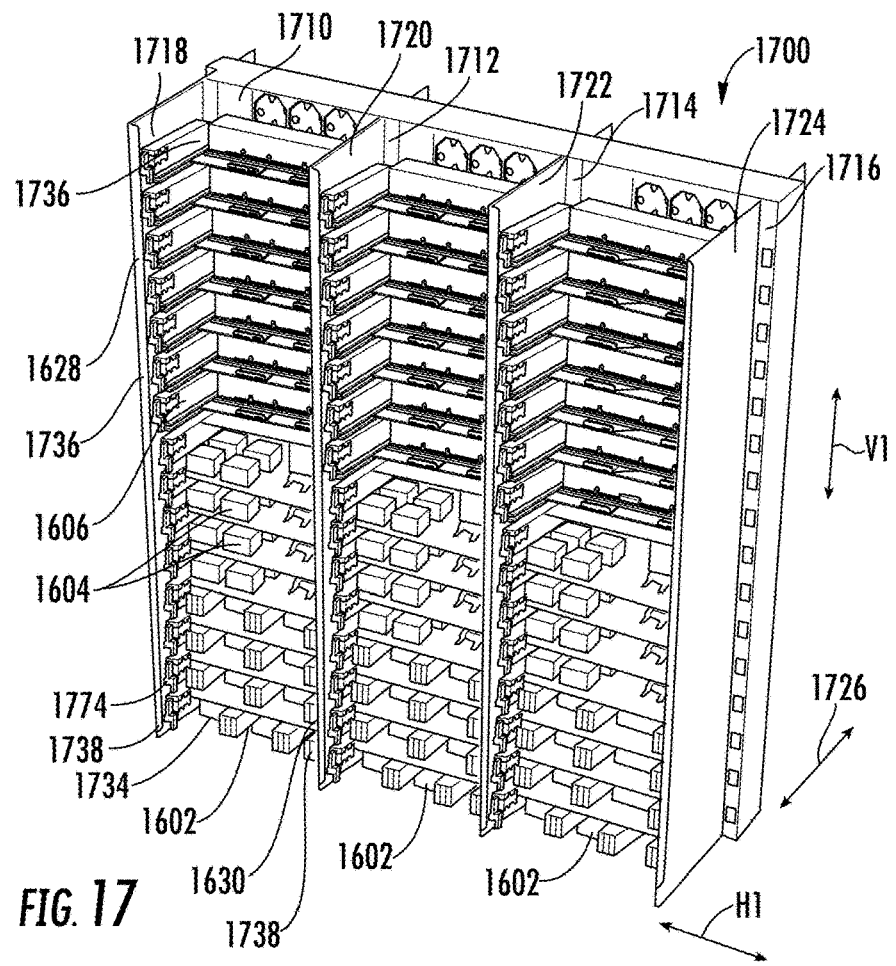
FIG. 17 is a perspective view of one embodiment of a rack pod of a data center.
Figure 18:
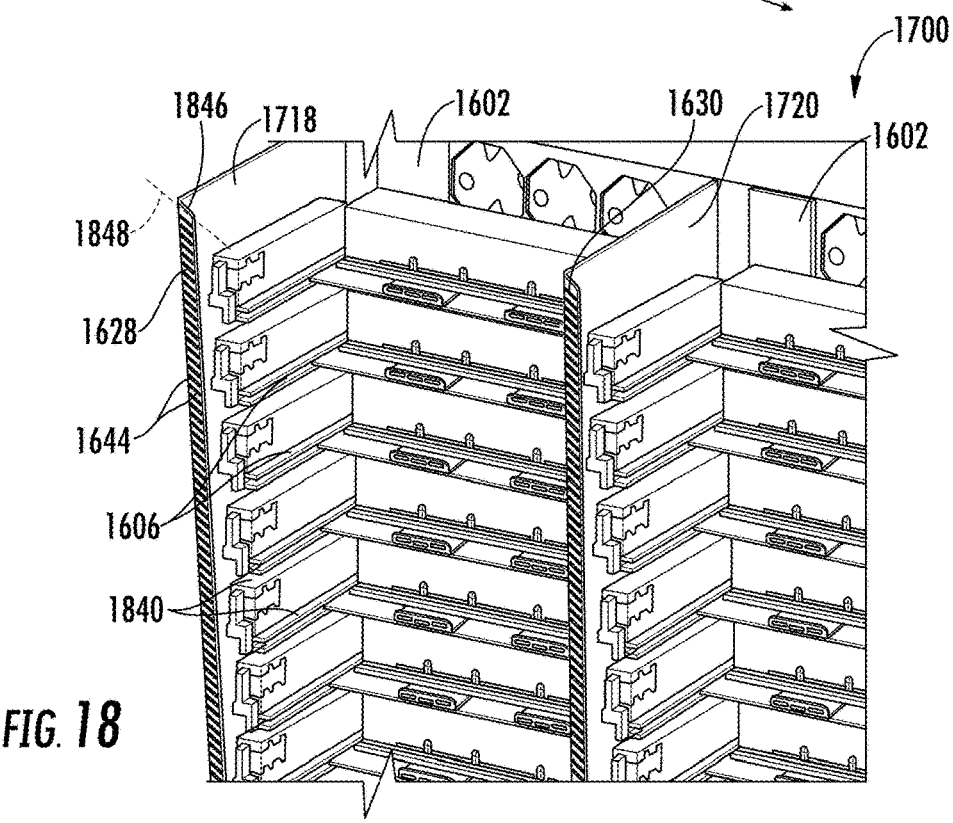
FIG. 18 is a detail view of the rack pod of FIG. 17 with multiple racks of the rack pod having guide tracks that are formed to include indexing slots.

Referring now to FIGS. 17 and 18, similar to the rack 240 discussed above, multiple racks 1602 may be combined to form a pod 1700, which may form a part of a corresponding data center similar to data center 100 described above. The pod 1700 includes one or more racks 1602 configured to house or otherwise receive one or more sleds 1604 for mounting therein. As discussed above, each rack 1602 includes multiple sled slots 1606, each of which is sized to receive a corresponding sled 1604. As depicted in FIGS. 17 and 18, the illustrative pod 1700 includes three racks 1602 that are secured together to form the pod 1700. Of course, it should be appreciated that the pod 1700 may include another suitable number of racks 1602 in other embodiments.

The illustrative rack pod 1700 includes elongated support posts 1710, 1712, 1714, 1716 that extend in a vertical direction indicated by arrow V1 and are spaced from one another in a horizontal direction indicated by arrow H1, as shown in FIG. 17. The illustrative rack pod 1700 also includes spines 1718, 1720, 1722, 1724 that extend in the vertical direction V1 and which are illustratively coupled, respectively, to the support posts 1710, 1712, 1714, 1716. More specifically, the spines 1718, 1720, 1722, 1724 are mounted to the respective support posts 1710, 1712, 1714, 1716 such that the spines 1718, 1720, 1722, 1724 extend outwardly from the support posts 1710, 1712, 1714, 1716 along a direction indicated by arrow 1726. The spines 1718, 1720, 1722, 1724 are spaced from one another in the horizontal direction H1 such that the spines 1718, 1720, 1722, 1724 cooperate to at least partially define the plurality of sled slots 1606.

Each of the racks 1602, and the spines 1718, 1720, 1722, 1724 thereof, are substantially identical to one another. Using the spines 1718, 1720 of one of the racks 1602 as an example, the spines 1718, 1720 illustratively include respective guide tracks 1628, 1630 that define respective outermost edges 1736, 1738 of the spines 1718, 1720 along the direction 1726, as shown in FIG. 17. Each guide track 1628, 1630 includes a plurality of indexing slots 1644 (best seen in FIG. 18) that are configured to interface with climbing gears (e.g., climbing gears 1656, 1658 shown in FIG. 19) of the robot 1650 when the sled table 1654 of the robot 1650 is coupled to one of the racks 1602 (e.g., the sled table 1654 may register with a corresponding rack 1602), as further discussed below. The indexing slots 1644 facilitate movement of the sled table 1654 of the robot 1650 along any of the racks 1602 in the vertical direction V1 to any of the sleds 1604 mounted in the sled slots 1606. As such, the indexing slots 1644 provide design features that facilitate automation of a variety of maintenance tasks of the pod 1700 by the robot 1650. For example, the robot 1650 is capable of servicing, upgrading, and/or replacing various sleds 1604 by removing or installing sleds 1604 into/from their respective sled slot 1606. To do so, as discussed in more detail below, the robot 1650 is configured to couple with the indexing slots 1644 of the guide tracks 1628, 1630 of a corresponding rack 1602 to move vertically along the corresponding rack 1602 to the desired sled slot 1606 and retrieve or install a sled 1604 as needed.

When each of the plurality of sleds 1604 is mounted in a corresponding sled slot 1606, the sleds 1604 are spaced from one another in the vertical direction V1. The guide tracks 1628, 1630 of adjacent spines 1718, 1720, 1722, 1724 are spaced apart in the horizontal direction H1 to define openings 1840 into the plurality of sled slots 1606, as best seen in FIG. 18. Again, as described below, the sleds 1604 mounted in the sled slots 1606 may be removed by the robot 1650 through the openings 1840 by the robot 1650. Following removal of a sled 1604 from a corresponding sled slot 1606, that sled 1604 (or another sled 1604) may be inserted through an opening 1840 into another sled slot 1606 (of the same or different rack 1502) by the robot 1650 or moved to a holding rack or location. In this way, the robot 1650 may replace or swap sleds 1604 as needed.

In the illustrative embodiment, each of the guide tracks 1628, 1630 of the spines 1718, 1720, 1722, 1724 extends from a vertically-lowermost one of the sled slots 1606 to a vertically-uppermost one of the sled slots 1606 of the racks 1602. Using the guide track 1628 as an example, the guide track 1628 extends from a vertically-lowermost sled space 1734 of the sled slots 1606 to a vertically-uppermost sled space 1736 of the sled slots 1606, as shown in FIG. 17. Of course, it should be appreciated that the number of sled slots 1606 over which each of the guide tracks 1628, 1630 vertically extends may vary depending on the particular configuration of the racks 1602. In embodiments in which the racks 1602 each have a "1U" configuration, for example, each of the guide tracks 1628, 1630 may extend vertically over nineteen sled slots 1606. In any case, the indexing slots 1644 of each of the guide tracks 1628, 1630 extend in the vertical direction V1 from a sled space that is located adjacent to a vertically-lowermost one of the sled slots 1606 to a vertically-uppermost one of the sled slots 1606. Again, using the guide track 1628 as an example, the indexing slots 1644 of the guide track 1628 extend in the vertical direction V1 from a sled space 1738 that is vertically adjacent to the sled space 1734 to the sled space 1736.

The illustrative indexing slots 1644 formed in the guide tracks 1628, 1630 of each of the spines 1718, 1720, 1722, 1724 include, or are otherwise embodied as, any features shaped to interact or register with the gears 1656, 1658 of the sled table 1654 to facilitate movement of the sled table 1654 along one of the racks 1602 in the vertical direction V1, as indicated above. Each of the indexing slots 1644 extends along an axis at an angle to the direction 1726. For example, using an uppermost indexing slot 1846 of the indexing slots 1644 as an example, the indexing slot 1846 extends along an axis 1848 at an angle to the direction 1726.

Each of the guide tracks 1628, 1630 of the spines 1718, 1720, 1722, 1724 is formed to include a docking aperture 1774 as shown in FIG. 17. The docking aperture 1774 formed in each of the guide tracks 1628, 1630 is located vertically below the indexing slots 1644 formed in each of the guide tracks 1628, 1630. As further discussed below, each docking aperture 1774 is configured to interface or register with a corresponding locating fastener 2602 (see FIG. 26) of the sled table 1654 of the robot 1650 to secure the sled table 1654 to one of the racks 1602 in preparation for advancement of the sled table 1654 along the rack 1602 in the vertical direction V1.

Figure 19:
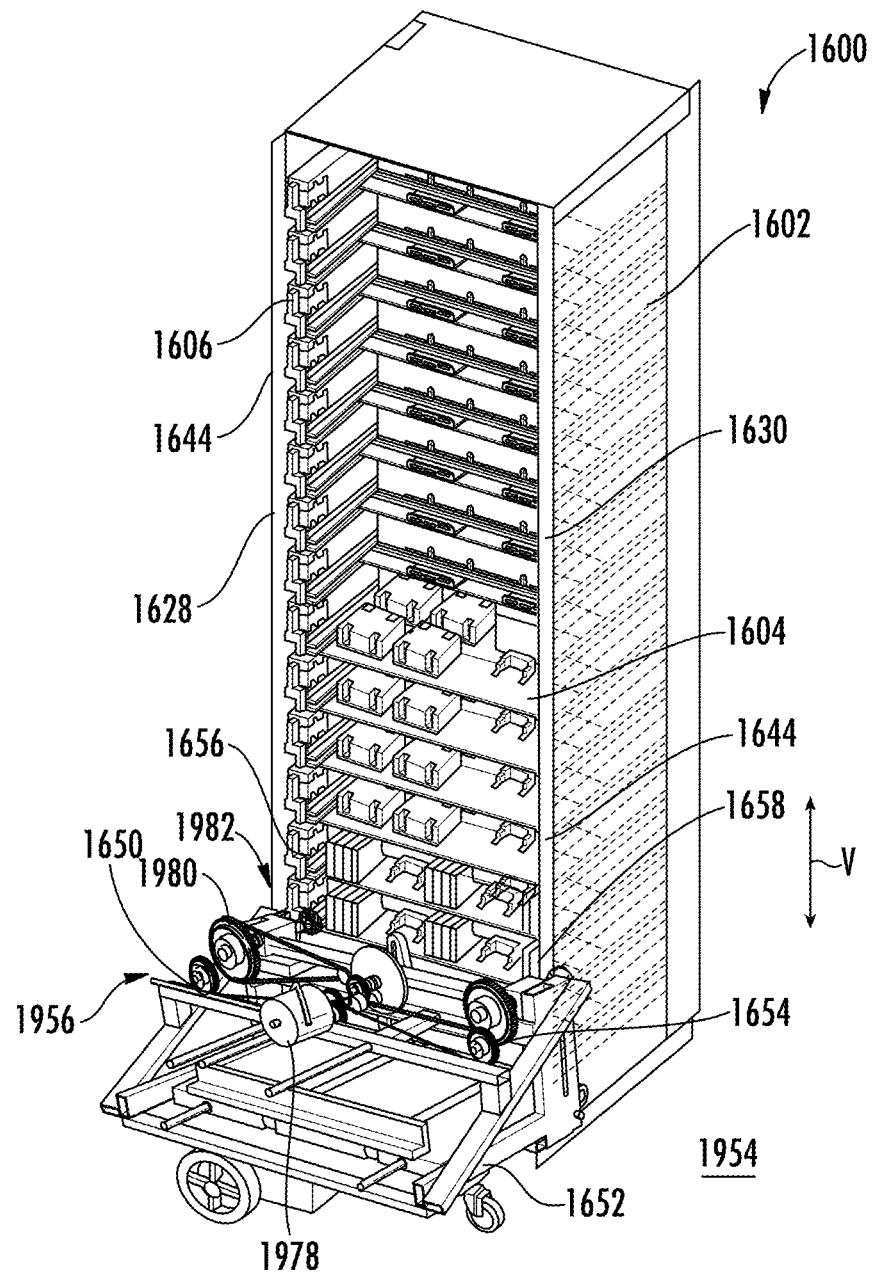
FIG. 19 is a perspective view of one embodiment of the system of FIG. 16 with a sled table of the robot supported by a cart of the robot in close proximity to the rack.
Figure 20:
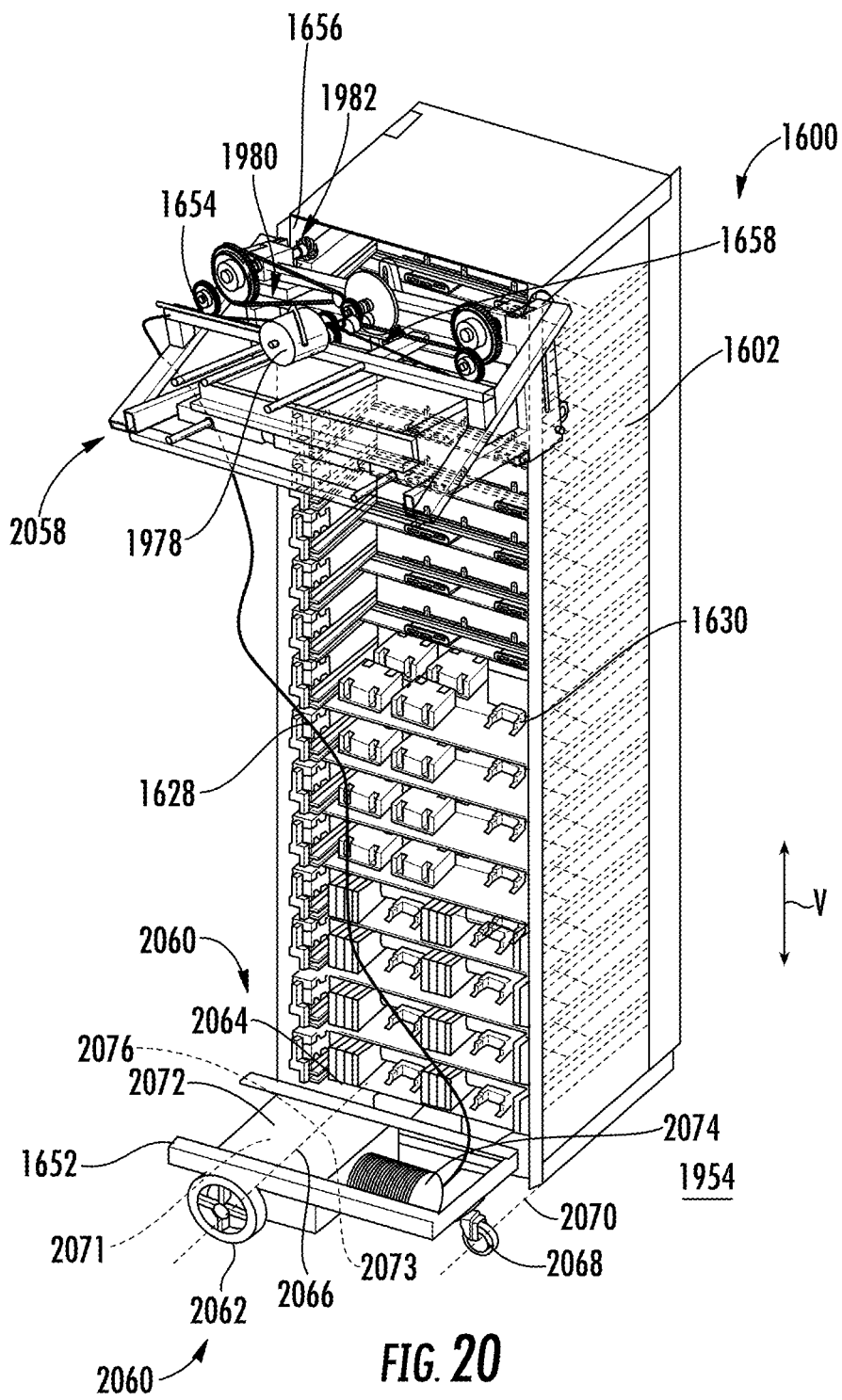
FIG. 20 is another perspective view of the system shown in FIG. 19 with the sled table of the robot supported by the rack and spaced from the cart.

Referring now to FIGS. 19 and 20, as discussed above, the robot 1650 is configured to couple itself to the rack 1602 during operation to maintain sleds 1604 housed in the rack 1602. Once so coupled, the sled table 1654 of the robot 1650 is configured to engage the indexing slots 1644 of the guide tracks 1628, 1630 to move in the vertical direction indicated by arrow V along the height of the rack 1602. In this way, the sled table 1654 may position itself to access any one of the sled slots 1606 of the rack 1602 to install, remove, or swap corresponding sleds 1604. When the sled table 1654 moves along the rack 1602 in the vertical direction V, the sled table 1654 is supported by the rack 1602 such that the weight of the sled table 1654 is borne by the rack 1602, rather than a stationary structure external to the rack 1602. As a consequence thereof, the illustrative robot 1650 may weigh less, be more compact, and be less costly than might otherwise be the case in those configurations in which the sled table 1654 is self-supported or otherwise supported by the cart 1652 when accessing a sled slot 1606.

As discussed above, the illustrative robot 1650 includes the cart 1652, which is moveable along a floor or other support surface 1954 of the data center in which the rack 1602 is located. In doing so, the robot 1650 may traverse through the data center (e.g., by moving down corridors of racks 1602, turning corners, etc.) to the location of the desired rack 1602. Once the robot 1650 has positioned itself by the rack 1602, the sled table 1654 couples to the rack 1602 as discussed above. The sled table 1654 is detachably coupled to the cart 1652 to allow the sled table 1654 to move along the rack 1602. More specifically, the sled table 1654 is movable relative to the cart 1652 in the vertical direction V between a stowed or contacted position 1956 (shown in FIG. 19) and a detached position 2058 (shown in FIG. 20). In the stowed position 1956, the sled table 1654 is in contact with the cart 1652 such that the sled table 1654 is supported by the cart 1652, rather than a structure external to the cart 1652 (e.g., the rack 1602). In the stowed position 1956, the sled table 1654 may be moved about the data center by the cart 1652. In contrast, in the detached position 2058, the sled table 1654 is vertically spaced from the cart 1652 such that the sled table 1654 is unsupported by the cart 1652. Instead, as discussed above, the sled table 1654 is supported by the rack 1602 in the detached position 2058.

In the illustrative embodiment, the cart 1652 includes a wheel assembly 2060 having a pair of wheels 2062, 2064 that are rotatable about a common axis 2066 and a wheel 2068 that is rotatable about an axis 2070 spaced from the axis 2066. In some embodiments, the cart 1652 may include a motor 2071, and in such embodiments, the wheel assembly 2060 may be coupled to, included in, or otherwise form a portion of, a drivetrain 2073 that is configured to transmit rotational power generated by the motor 2071 to the wheel assembly 2060 to propel the cart 1652 along the support surface 1954. In those embodiments, the motor 2071 and the drivetrain 2073, as well as other mechanical and electronic components included in the robot 1650, may be housed in a housing 2072 of the cart 1652.

The robot 1650 illustratively includes an umbilical cable 2074 that is coupled to, and at least partially supported by, the cart 1652. The umbilical cable 2074 mechanically couples the sled table 1654 to the cart 1652 when the sled table 1654 is moved relative to the cart 1652 between the stowed and detached positions 1956, 2058. In the illustrative embodiment, the umbilical cable 2074 is retractable toward the cart 1652 to facilitate movement of the sled table 1654 relative to the cart 1652 between the stowed and detached positions 1956, 2058. The robot 1650 includes a retraction mechanism 2076 that is configured to enable retraction of the umbilical cable 2074 to permit furling or unfurling of the umbilical cable 2074 in a controlled manner In the illustrative embodiment, the retraction mechanism 2076 is at least partially housed in the housing 2072 of the cart 1652. Of course, it should be appreciated that in other embodiments, the retraction mechanism 2076 may be housed in, supported by, or otherwise contained in, another structure of the cart 1652. In any case, the umbilical cable 2074 electrically couples the sled table 1654 to the cart 1652 when the sled table 1654 is moved relative to the cart 1652 between the stowed and detached positions 1956, 2058 to provide electrical power to the sled table 1654 during operation of the robot 1650. As such, the sled table 1654 need not have its own power supply, which decreases the overall weight of the sled table 1654.

In the illustrative embodiment, as further discussed below, the sled table 1654 includes a drive unit 1978, a transmission 1980 coupled to the drive unit 1978, and an output assembly 1982 coupled to the transmission 1980. The drive unit 1978 may be embodied as, or otherwise include, any device capable of supplying rotational power to the transmission 1980. For example, the drive unit 1978 may be embodied as, or otherwise include, an electric motor such as a servo motor or stepper motor, a hydraulic actuator, a piezoelectric actuator, a pneumatic actuator, or a mechanical actuator. The transmission 1980 includes, or is otherwise embodied as, any collection of devices capable of transmitting rotational power supplied by the drive unit 1978 to the output assembly 1982 such as, for example, an assembly of gears, drive shafts, etc.

The output assembly 1982 may be embodied as, or otherwise include, any collection of devices capable of being acted upon by rotational power transmitted thereto by the transmission 1980 to impart movement to the sled table 1654. The output assembly 1982 of the sled table 1654 includes the climbing gears 1656, 1658, as shown in FIGS. 19 and 20. As discussed above, the climbing gears 1658 interact with the guide tracks 1628, 1630 to facilitate movement of the sled table 1654 along the rack 1602 in the vertical direction V. More specifically, in response to receiving rotational power transmitted thereto by the transmission 1980 as further discussed below, each of the climbing gears 1656, 1658 interacts with the indexing slots 1644 formed in a corresponding one of the guide tracks 1628, 1630 when the sled table 1654 moves along the rack 1602 in the vertical direction V.

Figure 21:
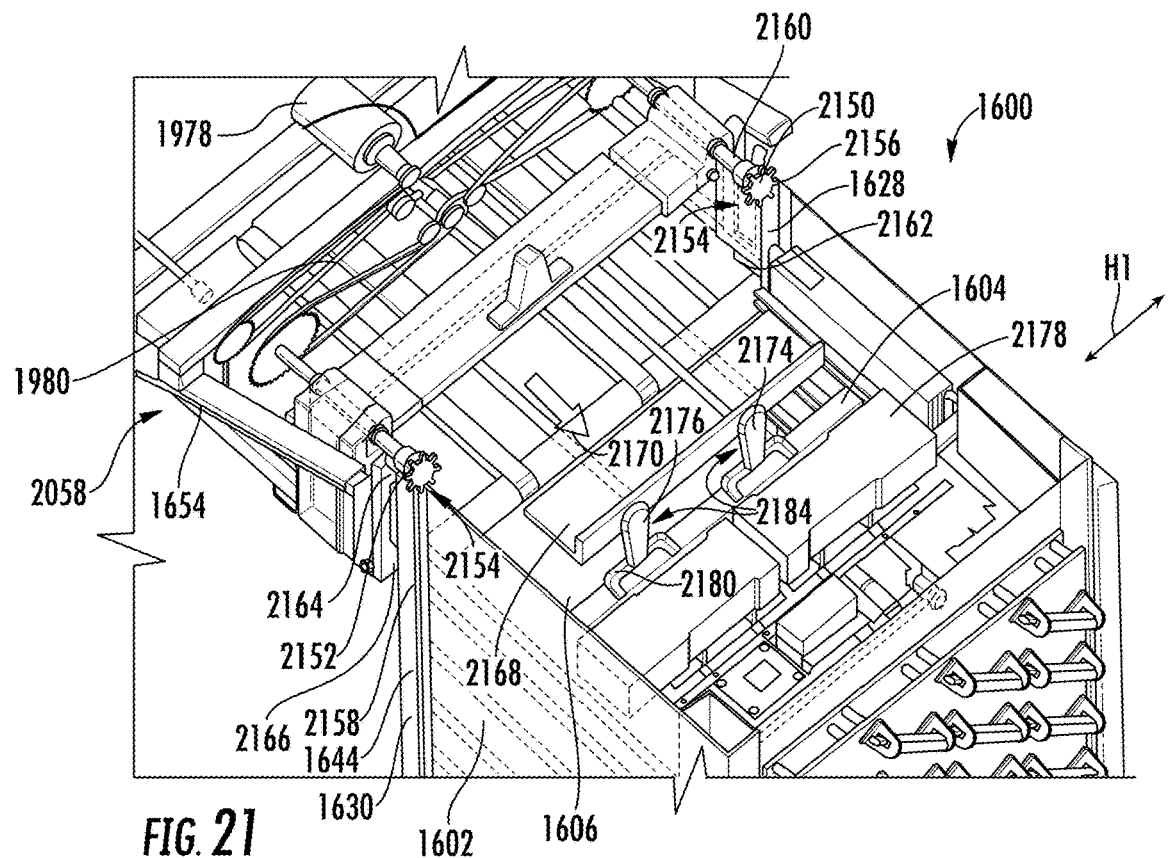
FIG. 21 is a partial perspective view of the system shown in FIG. 19 with a rake of the sled table advanced into the rack to retrieve a sled mounted in the rack.
Figure 22:
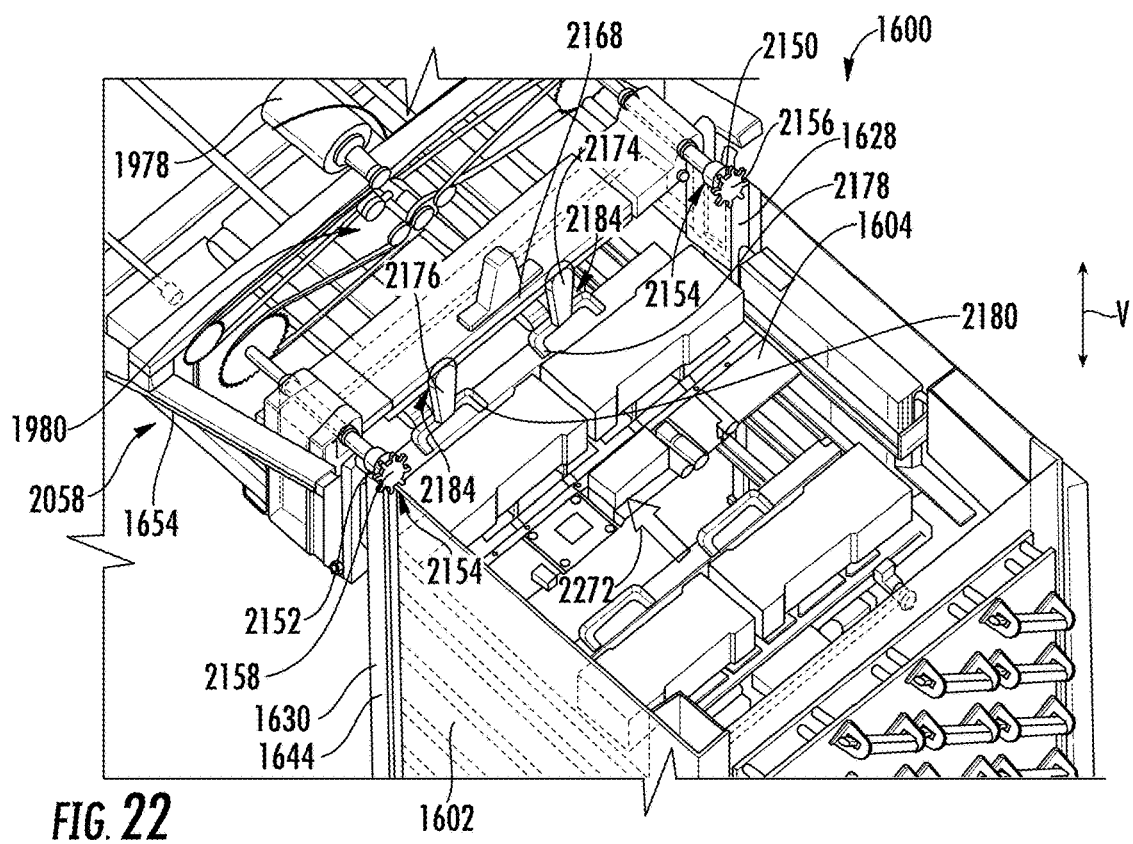
FIG. 22 is a partial perspective view of the system similar to FIG. 21 with the sled being removed from the rack by the rake.
Figure 23:
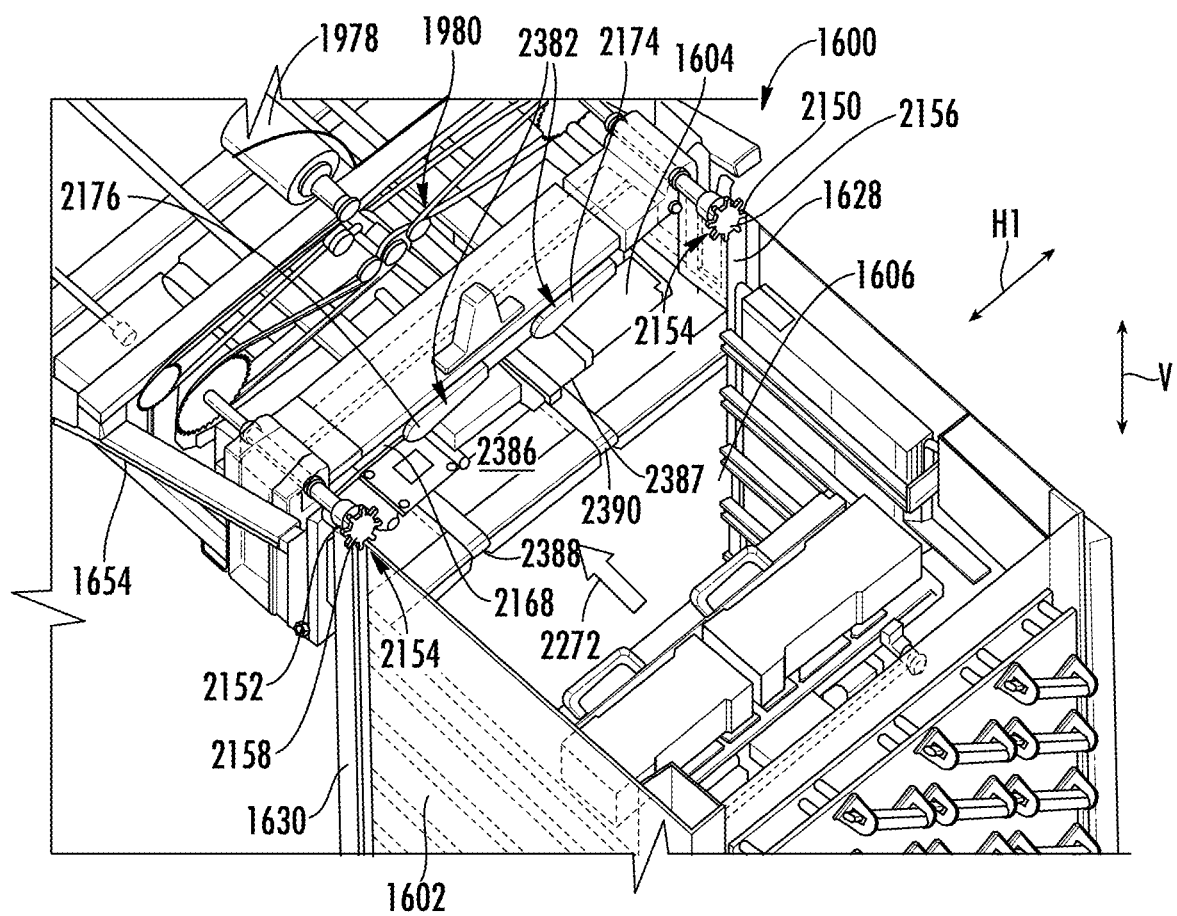
FIG. 23 is a partial perspective view of the system similar to FIG. 21 with the sled positioned on the sled table after being removed by the rake from the rack.

Referring now to FIGS. 21-23, in the illustrative embodiment, the climbing gears 1656, 1658 are embodied as substantially identical helical gears 2150, 2152. Of course, it should be appreciated that in other embodiments, the climbing gears 1656, 1658 may be embodied as another suitable type and/or number of gears. In any case, the helical gears 2150, 2152 may each be arranged relative to the respective guide tracks 1628, 1630 in an engaged position 2154. In the engaged position 2154, gear teeth 2156, 2158 of the respective helical gears 2150, 2152 are in contact with the respective guide tracks 1628, 1630 to enable interaction of the gear teeth 2156, 2158 with the indexing slots 1644, thereby facilitating movement of the sled table 1654 along the rack 1602 in the vertical direction V. Each of the indexing slots 1644 is therefore shaped to interact with one of the helical gears 2150, 2152 when the helical gears 2150, 2152 are in the engaged position 2154 relative to the guide tracks 1628, 1630. More specifically, as indicated above, each of the indexing slots 1644 is angled relative to the direction 1726 to facilitate interaction with one of the helical gears 2150, 2152 when the helical gears 2150, 2152 are in the engaged position 2154. In the illustrative embodiment, when the sled table 1654 is supported by the rack 1602 in the detached position 2058, and when the sled table 1654 moves along the rack 1602 in the vertical direction V, each of the helical gears 2150, 2152 is in the engaged position 2154 relative to the guide tracks 1628, 1630.

The sled table 1654 illustratively includes rollers 2160, 2162, 2164, 2166 that each include, or are otherwise embodied as, any device or collection of devices capable of contacting one of the guide tracks 1628, 1630 of the rack 1602 to facilitate movement of the sled table 1654 along the rack 1602 in the vertical direction V. Although the sled table 1654 includes four rollers 2160, 2162, 2164, 2166, it should be appreciated that in other embodiments, the sled table 1654 may include another suitable number of rollers. In any case, the rollers 2160, 2162 are in contact with the guide track 1628 and the rollers 2164, 2166 are in contact with the guide track 1630, as shown in FIGS. 21-23. The helical gears 2150, 2152 are arranged relative to the respective guide tracks 1628, 1630 in the engaged position 2154 such that each of the helical gears 2150, 2152 is aligned with at least one of the rollers 2160, 2162, 2164, 2166 in a horizontal direction indicated by arrow H1. More specifically, in the engaged position 2154 of the helical gears 2150, 2152 relative to the guide tracks 1628, 1630, the roller 2160 is aligned with the helical gear 2150 in the horizontal direction H1 and the roller 2164 is aligned with the helical gear 2152 in the horizontal direction H1.

In the illustrative embodiment, the sled table 1654 includes a rake 2168 that is movable relative to the rack 1602 into any of the sled slots 1606 (as shown in FIG. 21) and out of any of the sled slots 1606 (as shown in FIGS. 22 and 23). The rake 2168 is movable into one of the sled slots 1606 in a direction 2170 to retrieve the corresponding sled 1604 mounted in the sled slot 1606, and the rake 2168 is movable out of the sled slot 1606 in a direction 2272 to remove the sled 1604 mounted in the sled slot 1606 to be carried by the sled table 1654 as discussed below. In some embodiments, the rake 2168 may be included in the output assembly 1982 of the sled table 1654.

The sled table 1654 illustratively includes fingers 2174, 2176 that are coupled to the rake 2168 and movable relative thereto. Although two fingers 2174, 2176 are depicted in FIGS. 21-23, it should be appreciated that in other embodiments, the sled table 1654 may include another suitable number of fingers. In any case, each of the fingers 2174, 2176 may be embodied as, or otherwise include, any device capable of being received by one of the sleds 1604 mounted in a corresponding sled slot 1606 to allow movement of the sled 1604 by the rake 2168. For example, in the illustrative embodiment, each of the sleds 1604 is formed to include handles 2178, 2180 that are sized to receive the corresponding fingers 2174, 2176 to facilitate retrieval of, and removal of, any of the sleds 1604 from the corresponding sled slots 1606 and onto a sled-receiving tray 2386 of the sled table 1654 as discussed below. Although each sled 1604 includes two handles 2178, 2180, it should be appreciated that in other embodiments, each sled 1604 may include another suitable number of handles depending on, for example, the number of fingers included in the sled table 1654. In some embodiments, the fingers 2174, 2176 may be included in the output assembly 1982 of the sled table 1654.

Each of the fingers 2174, 2176 is illustratively movable relative to the rake 2168 between a stowed position 2382 (shown in FIG. 23) and a deployed position 2184 (shown in FIGS. 21 and 22). More specifically, each of the fingers 2174, 2176 is rotatable relative to the rake 2168 between the stowed and deployed positions 2382, 2184. In the stowed position 2382, each of the fingers 2174, 2176 extends along the rake 2168 in the horizontal direction H1 without extending outwardly from the rake 2168 in the vertical direction V. The fingers 2174, 2176 are not positioned to interact with the handles 2178, 2180 of any of the sleds 1604 in the stowed position 2382. In contrast, in the deployed position 2184, each of the fingers 2174, 2176 extends outwardly from the rake 2168 in the vertical direction V to enable the fingers 2174, 2176 to interact with the handles 2178, 2180 of any of the sleds 1604. Accordingly, the fingers 2174, 2176 are positioned to retrieve any of the sleds 1604 from the corresponding sled slot 1606 and remove the sled 1604 from the sled slot 1606 when the fingers 2174, 2176 are in the deployed position 2184. It should be appreciated that the fingers 2174, 2176 embody a more simplified end effector as opposed to a typical robotic pincher-type end effector and the typical functionality of such robotic pincher-type end effector is separated into two functions—force generation to move the corresponding sled 1604 and location control.

In the illustrative embodiment, the sled table 1654 also includes the sled-receiving tray 2386 on which any of the sleds 1604 mounted in the sled slots 1606 may be stored following retrieval and removal of the sled 1604 from the sled slot 1606 using the rake 2168 and the fingers 2174, 2176, as shown in FIG. 23. The sled-receiving tray 2386 includes a sled-receiving pocket 2387 that is configured to store the sled 1604 during operation of the sled table 1654. Conveyor tracks 2388, 2390 coupled to, or otherwise included in, the sled-receiving tray 2386 are movable relative to the sled-receiving tray 2386 to advance any of the sleds 1604 retrieved and removed from one of the sled slots 1606 onto the sled-receiving tray 2386 in the direction 2272. When the sled 1604 removed and retrieved from the sled slot 1606 is positioned at least partially on the sled-receiving tray 2386, movement of the conveyor tracks 2388, 2390 relative to the tray 2386 advances the sled 1604 all the way onto the tray 2386. Furthermore, when the sled 1604 is positioned at least partially on the sled-receiving tray 2386, movement of the fingers 2174, 2176 relative to the rake 2168 from the deployed position 2184 to the stowed position 2382 permits the sled 1604 to advance all the way onto the tray 2386 without interference from the fingers 2174, 2176. In some embodiments, the sled-receiving tray 2386 may be included in the output assembly 1982 of the sled table 1654.

Figure 24:
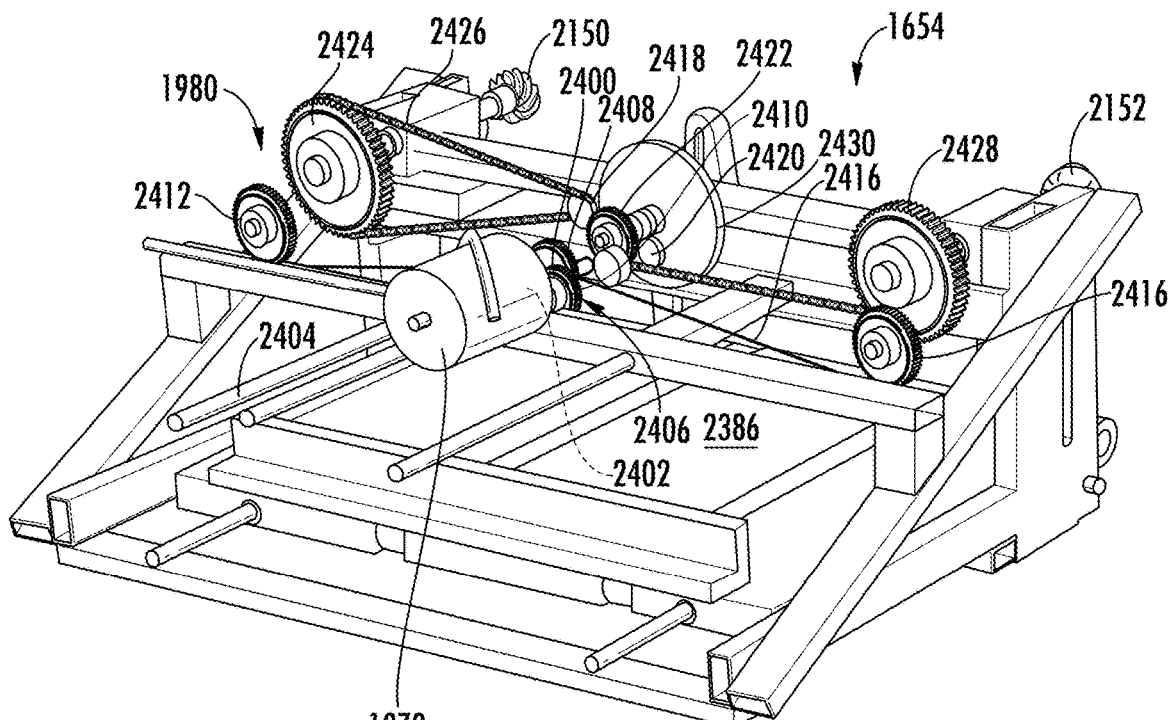
FIG. 24 is a perspective view of the sled table shown in FIGS. 21-23.
Figure 25:
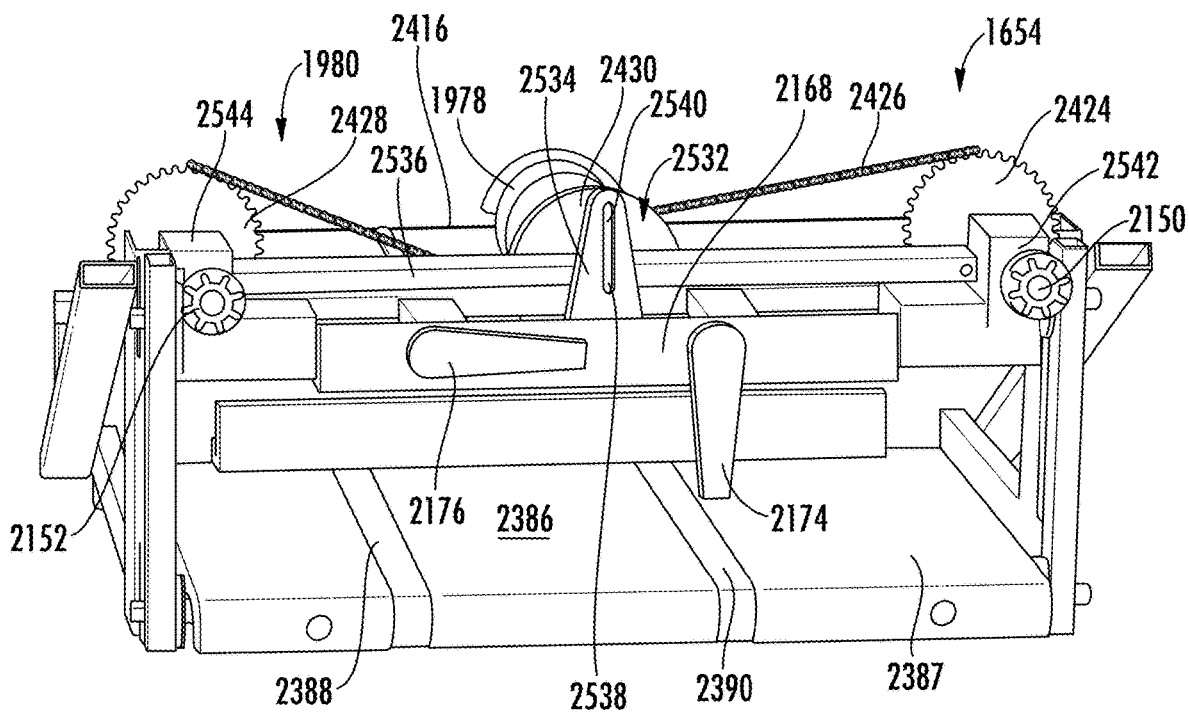
FIG. 25 is another perspective view of the sled table shown in FIG. 24.

Referring now to FIGS. 24 and 25, a number of illustrative features of the transmission 1980 of the sled table 1654 are described hereinafter. It should be appreciated that the transmission 1980, and the sled table 1654 as a whole, may include additional features other than those described below. Accordingly, the description below is not intended to provide an exhaustive list of the features included in the transmission 1980, or the sled table 1654.

In the illustrative embodiment, the transmission 1980 may include an input shaft 2400 that is coupled to an output shaft 2402 of the drive unit 1978. The input shaft 2400 may be configured to receive rotational power supplied by the output shaft 2402 during operation of the sled table 1654. In some embodiments, the input shaft 2400 may provide an input to the transmission 1980. The input shaft 2400 may be configured for rotation about an axis 2404.

The illustrative transmission 1980 may include a gear assembly 2406 that is coupled to the input shaft 2400 and at least partially positioned about the axis 2404. The gear assembly 2406 may include at least two intermeshing gears 2408, 2410, and in some embodiments, the gear assembly 2406 may be coupled to toothed wheels 2412, 2414 via a chain 2416. The gear assembly 2406 may be coupled to idler pulleys 2418, 2420 that are arranged opposite one another relative to a gear 2422, which may be at least partially positioned about the axis 2404, in some embodiments. The gear 2422 may be coupled to a toothed sprocket 2424 via a chain 2426, and the idler pulley 2418 may be coupled to the sprocket 2424 via the chain 2426. The gear 2422 may be coupled to a toothed sprocket 2428 via the chain 2426, and the idler pulley 2420 may be coupled to the sprocket 2428 via the chain 2426. A scroll cam 2430 may be coupled to the gear 2422 and at least partially positioned about the axis 2404. The sprocket 2424 may be coupled to the helical gear 2150, and the sprocket 2428 may be coupled to the helical gear 2152.

In the illustrative embodiment, in combination with one or more other components, the gear assembly 2406 and the gears 2408, 2410, the toothed wheels 2412, 2414, the chain 2416, the idler pulleys 2418, 2420, the gear 2422, the toothed sprockets 2424, 2428, the chain 2426, and the scroll cam 2430 may cooperate to transmit rotational power supplied to the input shaft 2400 to the helical gears 2150, 2152 to cause rotation of the helical gears 2150, 2152. When the helical gears 2150, 2152 are each in the engaged position 2154, rotation of the helical gears 2150, 2152 may cause, or at least facilitate, movement of the sled table 1654 along the rack 1602 in the vertical direction V. It should be appreciated, of course, that in some embodiments, the transmission 1980 may include any other suitable device or collection of devices in addition to, or in lieu of, the aforementioned components, such as one or more linkages, clutches, pinions, gears, pulleys, chains, rails, belts, shafts, bearings, bars, rollers, levers, pins, brackets, or rods, for example.

A breakover mechanism 2532 may be included in the illustrative transmission 1980 or the output assembly 1982, as shown in FIG. 25. The breakover mechanism 2532 may include a guide 2534, a link 2536, a scroll pin 2538 sized to be received in a slot 2540 of the guide 2534 that is coupled to the link 2536, a bracket 2542 coupled to the link 2536, and a bracket 2544 coupled to the link 2536. The scroll cam 2430 may be configured to interact with the scroll pin 2538 to adjust the position of the scroll pin 2538 in the slot 2540. The brackets 2542, 2544 may be configured to interact with the respective helical gears 2150, 2152 to adjust the position of the helical gears 2150, 2152 in response to interaction between the scroll cam 2430 and the scroll pin 2538. In some embodiments, interaction between the scroll pin 2538 and the scroll cam 2430, as well as interaction between the brackets 2542, 2544 and the helical gears 2150, 2152, may cause the helical gears 2150, 2152 to move between a disengaged position 2600 and an engaged position 2700, which are discussed below.

Figure 26:
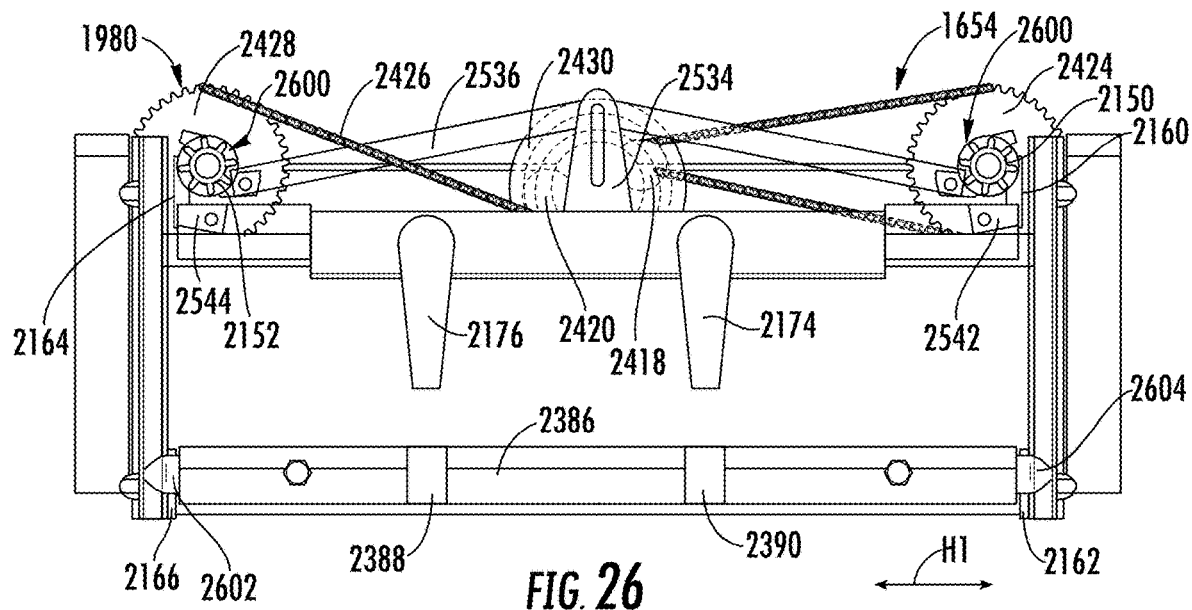
FIG. 26 is an elevation view of the sled table shown in FIG. 25 with helical gears of the sled table in a disengaged position and certain features omitted for the sake of simplicity.
Figure 27:
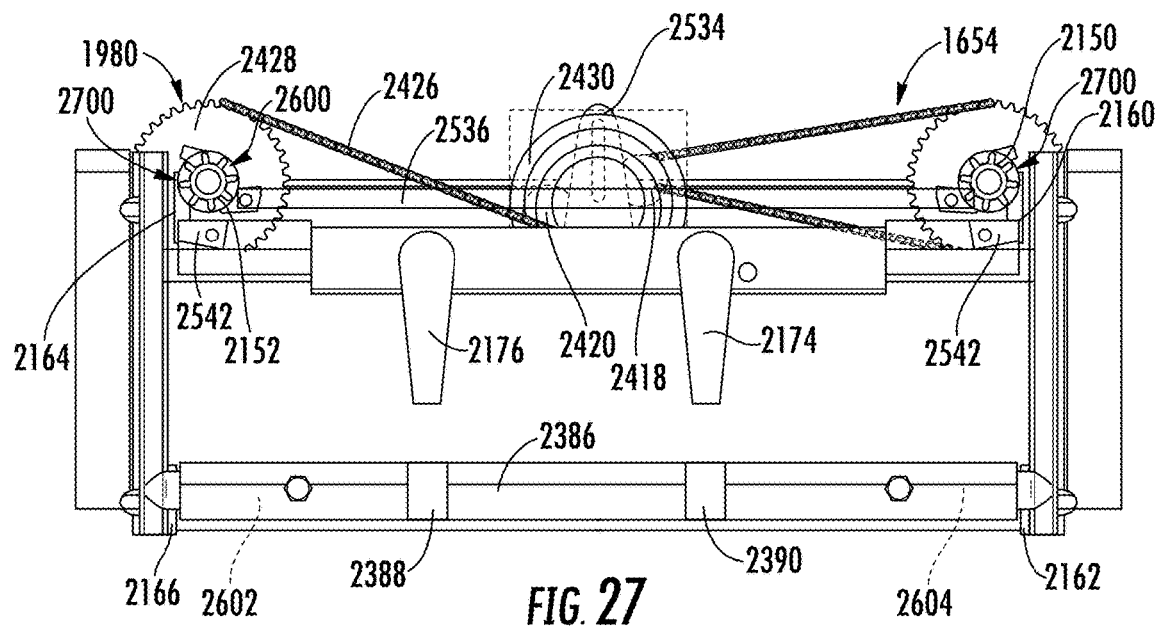
FIG. 27 is an elevation view of the sled table shown in FIG. 26 with helical gears of the sled table in an engaged position.

Referring now to FIGS. 26 and 27, the helical gears 2150, 2152 are illustratively movable relative to the respective rollers 2160, 2164 between the disengaged position 2600 (shown in FIG. 26) and the engaged position 2700 (shown in FIG. 27). In the disengaged position 2600, the helical gears 2150, 2152 are spaced apart, or offset, from the respective rollers 2160, 2164 in the horizontal direction H1. It should be appreciated that when the helical gears 2150, 2152 are in the disengaged position 2600 and the sled table 1654 is positioned in close proximity to the rack 1602 as shown in FIG. 19, for example, the helical gears 2150, 2152 are spaced from the corresponding guide tracks 1628, 1630. Accordingly, interaction of the gear teeth 2156, 2158 with the indexing slots 1644 formed in the guide tracks 1628, 1630 is resisted when the helical gears 2150, 2152 are in the disengaged position 2600 and the sled table 1654 is positioned in close proximity to the rack 1602. In the engaged position 2700, the helical gears 2150, 2152 are aligned with the respective rollers 2160, 2164 in the horizontal direction H1. Thus, when the helical gears 2150, 2152 are in the engaged position 2700 and the sled table 1654 is supported by the rack 1602, the helical gears 2150, 2152 interact with the indexing slots 1644 formed in the guide tracks 1628, 1630. The engaged position 2700 of the helical gears 2150, 2152 is therefore similar to the engaged position 2154 of the helical gears 2150, 2152.

The illustrative sled table 1654 includes locating fasteners 2602, 2604 that are positioned in the sled-receiving tray 2386, as shown in FIG. 26. The locating fasteners 2602, 2604 are sized to be received in the docking apertures 1774 to secure the sled table 1654 to the rack 1602 in preparation for advancement of the sled table 1654 along the rack 1602 in the vertical direction V. When the sled table 1654 is in the stowed position 1956 relative to the cart 1652 (e.g., as shown in FIG. 19), the locating fastener 2604 is inserted into the docking aperture 1774 formed in the guide track 1628, and the locating fastener 2602 is inserted into the docking aperture 1774 formed in the guide track 1630 to secure the sled table 1654 to the rack 1602.

Figure 28:
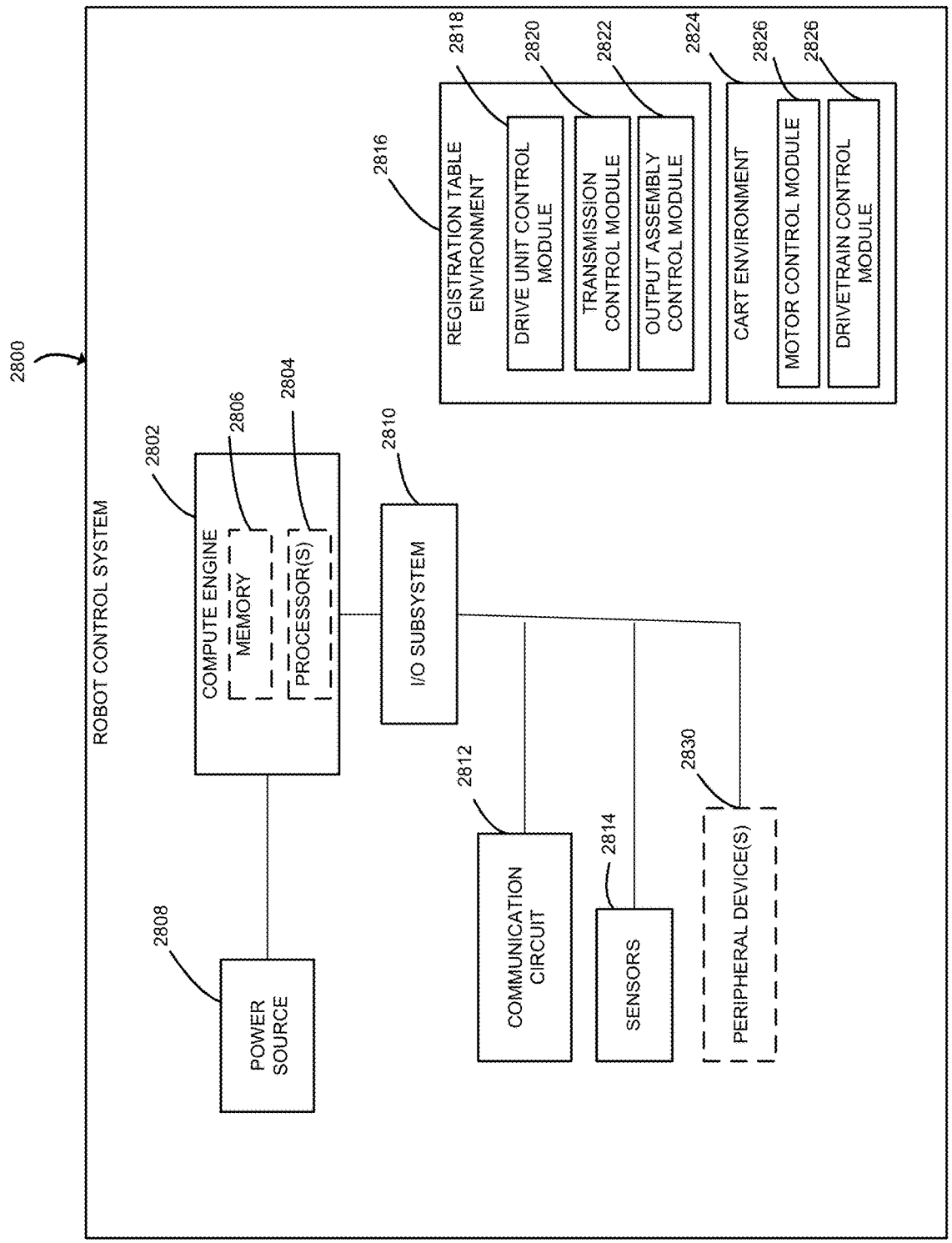
FIG. 28 is a diagrammatic view of a control system of the robot shown in FIG. 16.

Referring now to FIG. 28, an illustrative control system 2800 of the robot 1650 includes a number of components which, in some embodiments, may be located on the cart 1652. The illustrative control system 2800 includes a compute engine 2802, a power source 2808, an input/output ("I/O") subsystem 2810, a communication circuit 2812, and one or more sensors 2814. In some embodiments, the compute engine 2802 may establish a sled table environment 2816 and a cart environment 2824 during operation as discussed in more detail below. Of course, it should be appreciated that in other embodiments, the robot control system 2800 may include other or additional components. Additionally, in some embodiments, one or more of the illustrative components may be incorporated in, or otherwise form a portion of, another component.

The illustrative compute engine 2802 may be embodied as any type of device or collection of devices capable of performing various compute functions. In some embodiments, the compute engine 2802 may be embodied as a single device such as an integrated circuit, an embedded system, a field-programmable-array (FPGA), a system-on-a-chip (SOC), or other integrated system or device. Additionally, in some embodiments, the compute engine 2802 includes, or is otherwise embodied as, a processor 2804 and memory 2806. The processor 2804 may be embodied as any type of processor capable of processing input data and performing various functions in response to the processed data, such as controlling operation of the sled table 1654 and the cart 1652, among other things. As discussed below, the input data may include sensor data provided by sensors 2814. The processor 2804 may be embodied as a single or multi-core processor(s), digital signal processor, microcontroller, or other processor or processing/controlling circuit. Similarly, the memory 2806 may be embodied as any type of volatile or non-volatile memory or data storage capable of storing instructions for processing the input data and performing various functions in response to the processed data, among other things. In operation, the memory 2806 may store various data and software used during operation of the robot control system 2800 such as operating systems, applications, programs, libraries, and drivers.

The illustrative power source 2808 may be embodied as any type of device capable of powering the compute engine 2802, as well as other electronic components of the sled table 1654 and/or the cart 1652, at least in some embodiments. In some embodiments, the power source 2808 may be embodied as an energy storage unit such as a primary battery, for example. Additionally, in some embodiments, the power source 2808 may be embodied as an energy storage unit such as a rechargeable battery, for example. In any case, in the illustrative embodiment, the power source 2808 is located on the cart 1652 of the robot 1650. When the sled table 1654 is in the detached position 2058 (e.g., as shown in FIG. 20) relative to the cart 1652, or when the sled table 1654 is in the stowed position 1956 (e.g., as shown in FIG. 19) relative to the cart 1652, the power source 2808 may be coupled to, and charged by, a power distribution network (not shown) of the rack 1602. Consequently, the illustrative power source 2808 may have a smaller size than in other configurations, which may facilitate, or otherwise be associated with, a reduced weight and/or cost of the robot 1650 compared to other configurations.

The illustrative compute engine 2802 is communicatively coupled to other components of the robot control system 2800 via the I/O subsystem 2810, which may be embodied as circuitry and/or components to facilitate input/output operations with compute engine 2802 (e.g., with the processor 2804 and/or memory 2806) and other components of the control system 2800. For example, the I/O subsystem 2810 may include, or otherwise be embodied as, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 2810 may be incorporated, along with the processor 2804, the memory 2806, and other components of the control system 2800, into the compute engine 2802.

The illustrative communication circuit 2812 may be embodied as any type of communication circuit, device, or collection thereof, capable of enabling communications between various components of the robot 1650, such as between the sled table 1654 and the cart 1652, for example. In some embodiments, the communication circuit 2812 may enable communications between various components of the robot 1650 and one or more remote devices such that data may be communicated from the robot 1650 to the one or more remote devices, and vice versa, via a network. To do so, the communication circuit 2812 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The illustrative sensors 2814 may be embodied as any devices capable of sensing various characteristics associated with operation of the robot 1650. In some embodiments, the sensors 2814 may provide sensor data indicative of operational characteristics associated with the drive unit 1978, the transmission 1980, the output assembly 1982, the motor 2071, and/or the drivetrain 2073 to facilitate movement of the robot 1650. Additionally, in some embodiments, the sensors 2814 may provide sensor data indicative of operational characteristics associated with the rack 1602, such as temperature data, humidity data, airflow data, and/or radio frequency data, among other things. Of course, it should be appreciated that in other embodiments, the sensors 2814 may provide sensor data indicative of other suitable operational characteristics of the system 1600.

In some embodiments, the robot control system 2800 may also include one or more peripheral devices 2830. The peripheral devices 2830 may include any number of additional peripheral or interface devices, such as other input/output devices, storage devices, and so forth. The particular devices included in the peripheral devices 2830 may depend on, for example, the type and/or configuration of the robot 1650.

As discussed above, the compute engine 2802 may establish a sled table environment 2816 during operation to control various functions of the sled table 1654. The sled table environment 2816 includes a drive unit control module 2818, a transmission control module 2820, and an output assembly control module 2822. Each of the modules, logic, and other components of the sled table environment 2816 may be embodied as hardware, firmware, software, or a combination thereof. As such, in some embodiments, one or more modules of the sled table environment 2816 may be embodied as circuitry or a collection of electrical devices. In such embodiments, one or more of the drive unit control module 2818, the transmission control module 2820, and the output assembly control module 2822 may form a portion of the processor 2804 and/or other components of the compute engine 2802. Additionally, in some embodiments, one or more of the illustrative modules may form a portion of another module and/or one or more of the illustrative modules may be independent of one another. Further, in some embodiments, one or more of the modules of the sled table environment 2816 may be embodied as virtualized hardware components or emulated architecture, which may be established and maintained by the processor 2804 or other components of the compute engine 2802.

The drive unit control module 2818, which may be embodied as hardware, firmware, software, virtualized hardware, emulated architecture, and/or a combination thereof as discussed above, is configured to receive sensor data from the sensors 2814 that is indicative of operational characteristics associated with the drive unit 1978. Based on the data, the drive unit control module 2818 is configured to detect various operational conditions of the drive unit 1978 for diagnostic purposes, among other things. For example, based on sensor data provided by the sensors 2814, the drive unit control module 2818 may be configured to control the speed and direction of rotation of the drive unit 1978.

The transmission control module 2820, which may be embodied as hardware, firmware, software, virtualized hardware, emulated architecture, and/or a combination thereof as discussed above, is configured to receive sensor data from the sensors 2814 that is indicative of operational characteristics associated with the transmission 1980. Based on the data, the transmission control module 2820 is configured to detect various operational conditions of the transmission 1980 for diagnostic purposes, among other things. For example, based on sensor data provided by the sensors 2814, the transmission control module 2820 may be configured to control the speed and direction of rotation of one or more components of the transmission 1980.

The output assembly control module 2822, which may be embodied as hardware, firmware, software, virtualized hardware, emulated architecture, and/or a combination thereof as discussed above, is configured to receive sensor data from the sensors 2814 that is indicative of operational characteristics associated with the output assembly 1982. Based on the data, the output assembly control module 2822 is configured to detect various operational conditions of the output assembly 1982 for diagnostic purposes, among other things. For example, based on sensor data provided by the sensors 2814, the output assembly control module 2822 may be configured to control various operational characteristics of the breakover mechanism 2532, the helical gears 2150, 2152, the rake 2168, the fingers 2174, 2176, and the conveyor tracks 2388, 2390.

In the illustrative embodiment, the compute engine 2802 may also establish a cart environment 2824 during operation to control various functions of the cart 1652. The cart environment 2824 includes a motor control module 2826 and a drivetrain control module 2828. Each of the modules, logic, and other components of the cart environment 2824 may be embodied as hardware, firmware, software, or a combination thereof. As such, in some embodiments, one or more modules of the cart environment 2824 may be embodied as circuitry or a collection of electrical devices. In such embodiments, one or more of the motor control module 2826 and the drivetrain control module 2828 may form a portion of the processor 2804 and/or other components of the compute engine 2802. Additionally, in some embodiments, one or more of the illustrative modules may form a portion of another module and/or one or more of the illustrative modules may be independent of one another. Further, in some embodiments, one or more of the modules of the cart environment 2824 may be embodied as virtualized hardware components or emulated architecture, which may be established and maintained by the processor 2804 or other components of the compute engine 2802.

The motor control module 2826, which may be embodied as hardware, firmware, software, virtualized hardware, emulated architecture, and/or a combination thereof as discussed above, is configured to receive sensor data from the sensors 2814 that is indicative of operational characteristics associated with the motor 2071. Based on the data, the motor control module 2826 is configured to detect various operational conditions of the motor 2071 for diagnostic purposes, among other things. For example, based on the sensor data provided by the sensors 2814, the motor control module 2826 may be configured to control the speed and direction of rotation of the motor 2071.

The drivetrain control module 2828, which may be embodied as hardware, firmware, software, virtualized hardware, emulated architecture, and/or a combination thereof as discussed above, is configured to receive sensor data from the sensors 2814 that is indicative of operational characteristics associated with the drivetrain 2073. Based on the data, the drivetrain control module 2828 is configured to detect various operational conditions of the drivetrain 2073 for diagnostic purposes, among other things. For example, based on the sensor data provided by the sensors 2814, the drivetrain control module 2828 may be configured to control the speed and direction of rotation of various components of the drivetrain 2073. In some embodiments, in cooperation with the motor control module 2826, the drivetrain control module 2828 may control movement of the cart 1652 within the data center to a desired rack (e.g., the rack 1602).

Figure 29:
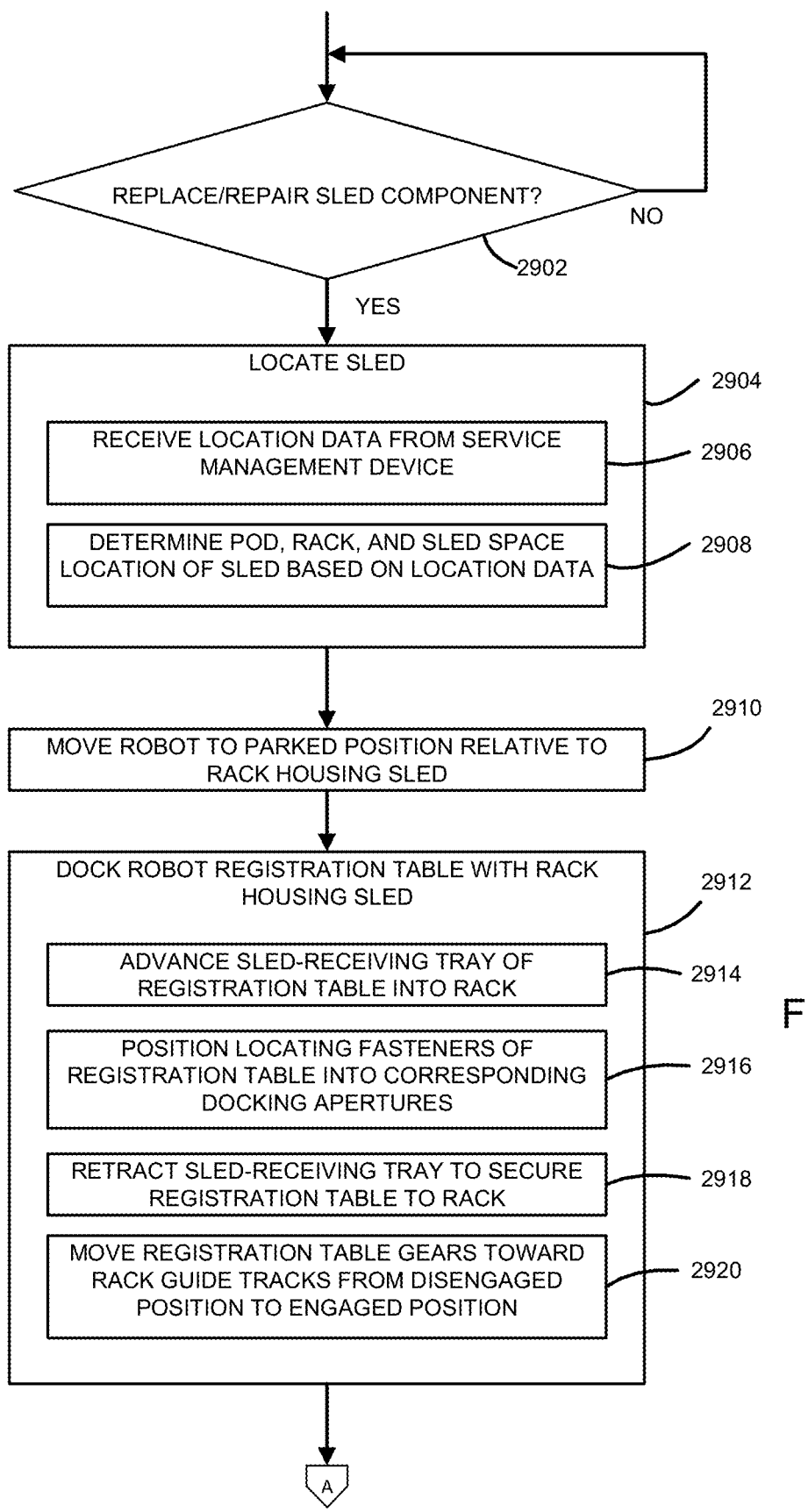
FIG. 29 is a simplified flowchart of one embodiment of a method of removing a sled from the racks shown in FIGS. 16, 18, and 19.
Figure 30:
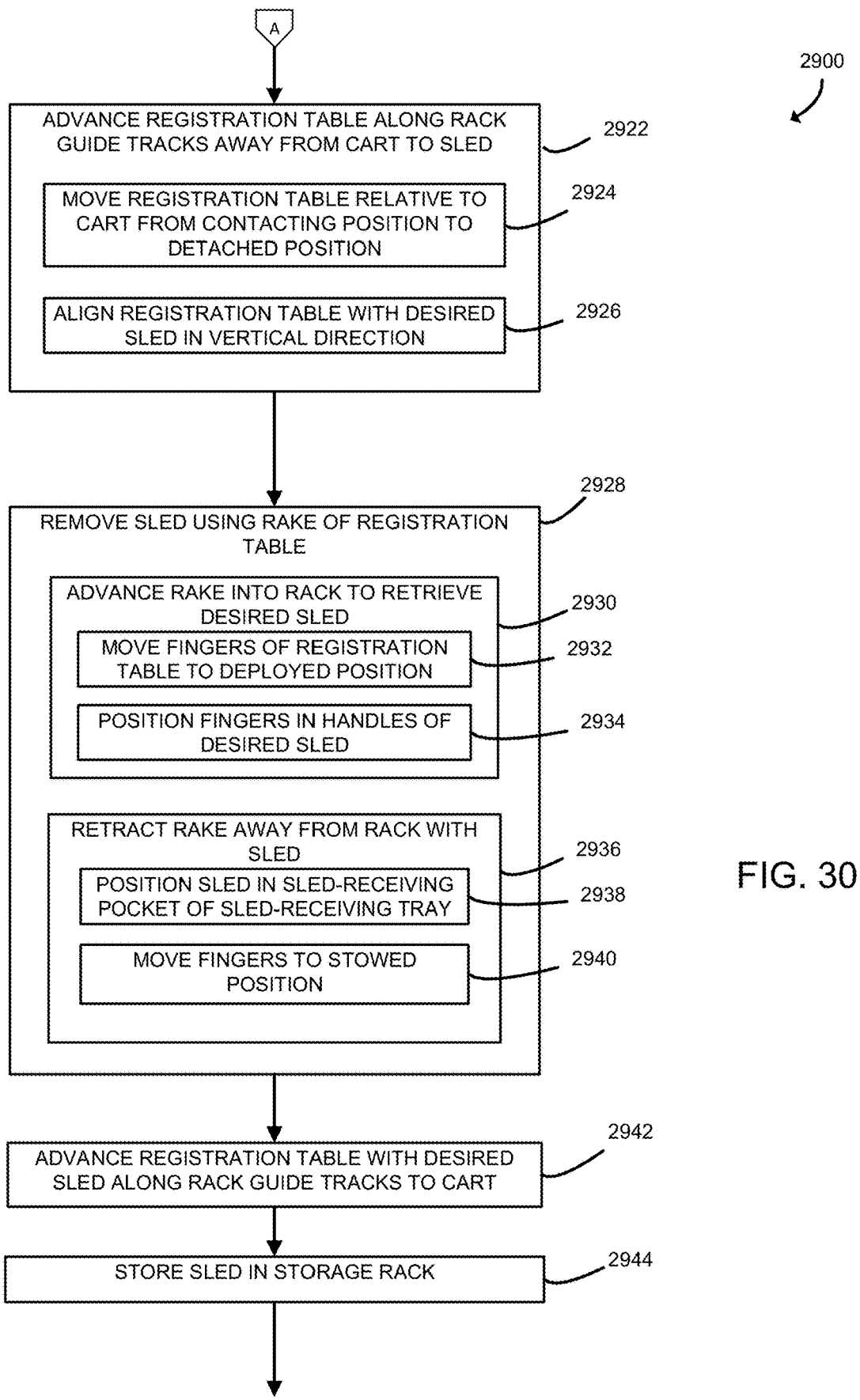
FIG. 30 is a simplified flowchart of the method of FIG. 29 with additional features depicted.

Referring now to FIGS. 29 and 30, during operation, the robot 1650 may execute a method 2900 for removing a sled 1604 from a corresponding rack 1602. The method 2900 begins with block 2902 in which a determination regarding whether one of the sleds 1604 is to be replaced or repaired is made. In some embodiments, the determination may be made by a service management device based on a failure report provided to the service management device by a monitoring module located on the rack 1602. In such embodiments, the service management device may be embodied as, or otherwise include, any remote device or collection of devices communicatively coupled to one or more failure reporting modules located on the racks 1602, such as the orchestrator server 1520. In any case, if it is determined that a sled 1604 is to be replaced or repaired in block 2902, the method 2900 proceeds to block 2904.

In block 2904, the sled 1604 to be replaced or repaired is located. To do so, the robot 1650 receives location data identifying the location of the sled 1604 to be replaced or repaired from the service management device (e.g., from the orchestrator server 1520) in block 2906. In block 2908, the robot 1650 determines the location of the sled 1604 to be replaced or repaired based on the location data received in block 2906. To do so, for example, the robot 1650 may determine the location of the corresponding pod 1700, the corresponding rack 1602, and the corresponding sled slot 1606 in which the sled 1604 to be replaced or repaired is located.

In block 2910, the robot 1650 moves to a parked position relative to the corresponding rack 1602 housing the desired sled 1604 to be replaced or repaired. To do so, the compute engine 2802 of the robot control system 2800 may control the cart 1652 (e.g., using the motor control module 2826 and/or drivetrain control module 2828) and direct movement thereof to the parked position relative to the corresponding rack 1602. In such embodiments, the parked position may be a position relative to the corresponding rack 1602 that facilitates access to the sled 1604 to be replaced or repaired through openings (e.g., openings 1840) of the corresponding sled slot 1606 of the rack 1602.

After the robot 1650 has been moved into position relative to the corresponding rack 1602, the sled table 1654 of the robot 1650 is docked with the corresponding rack 1602 in block 2912. To do so, the robot 1650 advances the sled-receiving tray 2386 into the rack 1602 in block 2914. For example, the compute engine 2802 may control the sled table 1654 using the drive unit control module 2818, the transmission control module 2820, and the output assembly control module 2822 to direct movement of the sled-receiving tray 2386 into the rack 1602. In doing so, the sled-receiving tray 2386 is moved into the rack 1602 such that the locating fasteners 2602, 2604 are positioned in the docking apertures 1774 when the sled table 1654 is in the stowed position 1956 in block 2916. Subsequently, in block 2918, the robot 1650 retracts the sled-receiving tray 2386 (e.g., away from the rack 1602) to secure the sled table 1654 to the rack 1602. Additionally, in block 2920, the helical gears 2150, 2152 are moved toward the corresponding guide tracks 1628, 1630 of the rack 1602 from the disengaged position 2600 to the engaged position 2700.

The method 2900 advances to block 2922 of FIG. 30. In block 2922, the sled table 1654 is advanced along the corresponding guide tracks 1628, 1630 of the rack 1602 away from the cart 1652. To do so, the robot 1650 moves the sled table 1654 relative to the cart 1652 from the stowed or contacting position 1956 to the detached position 2058 in block 2924. For example, the compute engine 2802 may control the sled table 1654 to direct movement thereof relative to the cart 1652 in the vertical direction V along the rack 1602. Additionally, in block 2926, the robot 1650 aligns the sled table 1654 with the desired sled 1604 in the vertical direction V. For example, the compute engine 2802 may control the sled table 1654 to direct movement thereof in the vertical direction V along the rack 1602 to the corresponding sled space 1606 in which the desired sled 1604 to be repaired or replaced is mounted.

Once the sled table 1654 is positioned to access the desired sled 1604, the method 2900 advances to block 2928. In block 2928, the sled table 1654 removes the desired sled 1604 from its corresponding sled slot 1606 using the rake 2168. To do so, the sled table 1654 advances the rake 2168 into the rack 1602 to retrieve the sled 1604 in block 2930. In block 2932, the fingers 2174, 2176 of the sled table 1654 are moved from the stowed position 2382 to the deployed position 2184 in preparation for interaction with the sled 1604. For example, the compute engine 2802 may control the sled table 1654 to direct movement of the fingers 2174, 2176 from the stowed position 2382 to the deployed position 2184. In doing so, the fingers 2174, 2176 are positioned in the handles 2178, 2180 of the desired sled 1602 in block 2934.

Once the fingers 2174, 2176 have been positioned within the handles 2178, 2180 of the desired sled 1602, the sled table 1654 retracts the rake 2168, along with the coupled sled 1604, away from the rack 1602 in block 2936. In doing so, in block 2938, the sled table 1654 retracts the rake 2168 such that the coupled sled 1604 is positioned in the sled-receiving pocket 2387 of the sled-receiving tray 2386. In some embodiments, to perform block 2938, the compute engine 2802 may control the sled table 1654 to direct retraction of the rake 2168 away from the rack 1602 until the sled 1604 is positioned in the sled-receiving pocket 2387. Subsequently, in block 2940, the fingers 2174, 2176 of the sled table 1654 are moved from the deployed position 2184 to the stowed position 2382. For example, the compute engine 2802 may control the sled table 1654 and direct movement of the fingers 2174, 2176 from the deployed position 2184 to the stowed position 2382.

After the desired sled 1604 has been moved onto the sled table 1654, the method 2900 advances to block 2942. In block 2942, the sled table 1654 with the desired sled 1604 positioned in the sled-receiving pocket 2387 is advanced along the corresponding guide tracks 1628, 1630 of the rack 1602 in the vertical direction V to the cart 1652. To do so, the compute engine 2802 may control the sled table 1654 to direct advancement thereof in the vertical direction V toward the cart 1652 until the sled table 1654 contacts, and is supported by, the cart 1652 (e.g., in the stowed or contacting position 1956).

After the desired sled 1604 has been retrieved and is carried by the robot 1650, the method 2900 proceeds to block 2944. In block 2944, the robot 1650 may move throughout the data center to a sled storage location and store the retrieved sled 1604 in a corresponding storage rack (not shown). In some embodiments, the storage rack may be substantially similar to the rack 1602 or otherwise be embodied as a rack configured to store sleds 1604. The sleds 1604 stored in the storage rack may be sleds 1604 for which failure reports have been generated, sleds undergoing routine maintenance, sleds 1604 whose operation life has expired, and/or replacement sleds.

Figure 31:
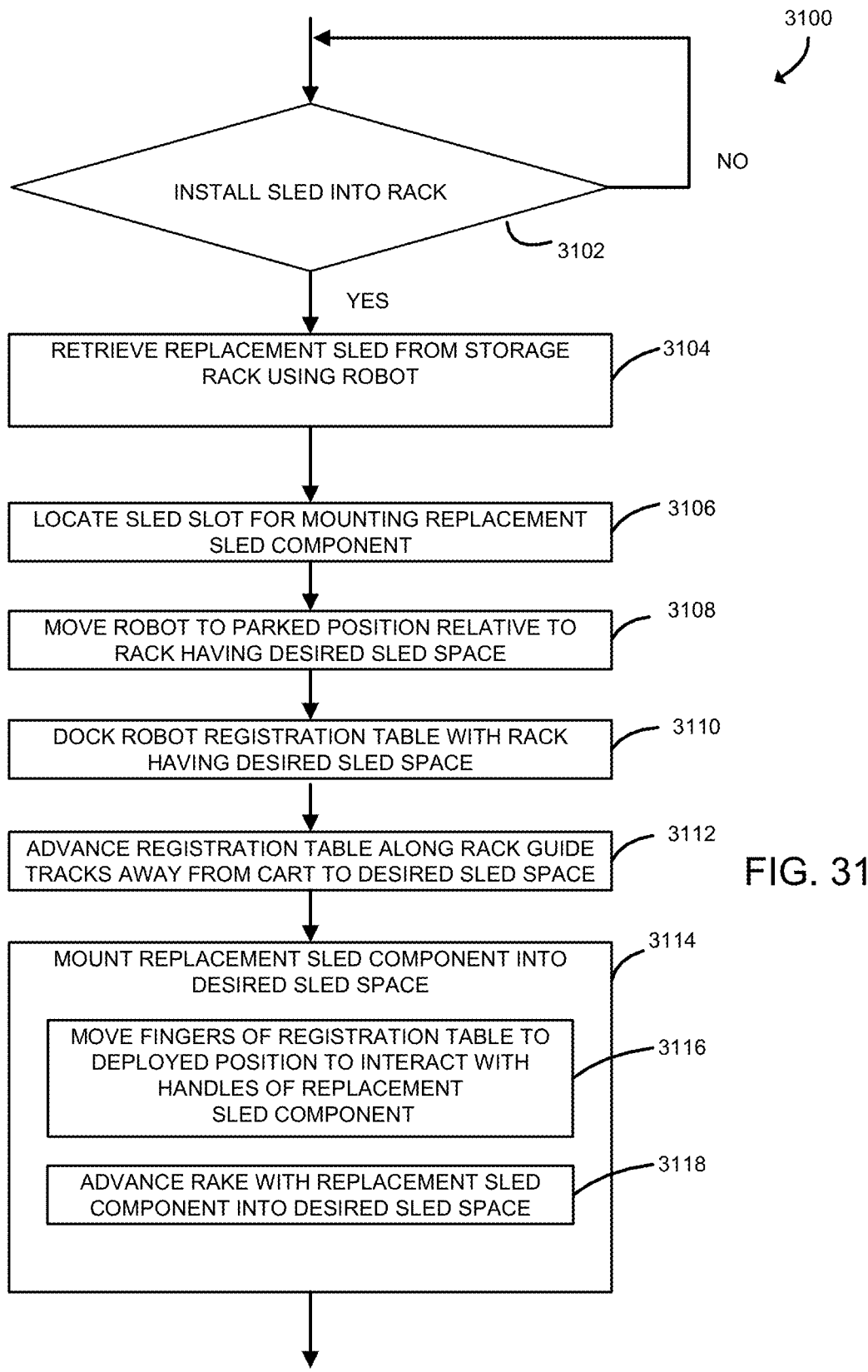
FIG. 31 is a simplified flowchart of one embodiment of a method of mounting a sled in the racks shown in FIGS. 16, 18, and 19.

Referring now to FIG. 31, during operation, the robot 1650 may execute a method 3100 for mounting a sled 1604 in a corresponding rack 1602. The method 3100 begins with block 3102 in which a determination regarding whether to install a sled 1604 into a corresponding sled slot 1606 of a corresponding rack 1604 is made. For example, the method 3100 may be executed subsequent to the execution of method 2900 to replace a failed or end-of-life sled 1604. Alternatively, the method 3100 may be executed to install a new sled 1604 into a previously unoccupied sled slot 1606 of a corresponding rack 1604. Regardless, in some embodiments, the determination may be made by a service management device, such as the orchestrator server 1520, and instructions to install the sled 1604 may be transmitted to the robot 1650 in block 3102.

In block 3104, the robot 1650 retrieves a sled 1604 from a storage location, such as a storage rack containing operational sleds 1604. As described above, the storage rack may be substantially similar to rack 1602 and may store replacement or new sleds 1604, which may be used to replace failing or end-of-life sleds 1604 and/or to populate new racks 1602. To retrieve the sled 1604, the robot 1650 may navigate the data center to the storage rack to retrieve the sled 1604.

After the robot 1650 has retrieved the sled 1604 to be mounted, the method 3100 advances to block 3106. In block 3106, the robot 1650 locates the sled slot 1606 in which the sled 1604 is to be mounted. In embodiments in which the robot 1650 is executing method 3100 to replace a sled 1604 previously removed from a rack 1602, the sled slot 1606 may correspond to the sled slot 1606 from which the previous sled 1604 was removed (e.g., in the situation in which the robot 1650 is replacing a failing sled 1604). It should be appreciated that the robot 1650 used to remove a sled 1650 from a rack 1602 (i.e., by executing method 2900) may be different from the robot 1650 used to install a replacement sled 1604 in the corresponding sled slot 1606 (i.e., by executing method 3100). To locate the sled slot 1606, the robot 1650 may perform functions similar to those described above in regard to block 2904 of method 2900.

After the robot 1650 has located or otherwise identified the location of the sled slot 1606 in which the sled 1604 is to be mounted, the method 3100 advances to block 3108. In block 3108, the robot 1650 navigates the data center to a parked position relative to the corresponding rack 1602 in which the desired sled space 1606 is located. To do so, the robot 1650 may perform functions similar to those described above in regard to block 2910 of method 2900.

After the robot 1650 moves to the corresponding rack 1602, the robot 1650 docks its sled table 1654 with the corresponding rack 1602 in block 3110. To do so, the robot 1650 may perform functions similar to those described above in regard to block 2912 of method 2900.

Subsequently, in block 3112, the sled table 1654 of the robot 1650, which is carrying the sled 1604 (e.g., a replacement sled 1604), is advanced along the corresponding guide tracks 1628, 1630 of the racks 1602 away from the cart 1652 to the desired sled slot 1606. To do so, the robot 1650 may perform functions similar to those described above in regard to block 2922 of method 2900.

After the sled table 1654 has been positioned with the desired sled slot 1606, the method 3100 advances to block 3114. In block 3114, the sled table 1654 mounts the sled 1604 into the corresponding sled slot 1606. To do so, in block 3116, the fingers 2174, 2176 of the sled table 1654 are moved from the stowed position 2382 to the deployed position 2184 to cause the fingers 2174, 2176 to interact with, and be received by, the handles 2178, 2180 of the sled 1604. Subsequently, in block 3118, the rake 2168 is advanced into the desired sled slot 1606 to cause the sled 1604 to be inserted into the corresponding sled slot 1606. As discussed above, the sled 1604 may include various connectors configured to automatically mate with connectors of the rack 1604 when the sled 1604 is slid into the sled slot 1606. In this way, the installing and removal of sleds 1604 from racks 1602 can be automated via use of the robot 1650.

EXAMPLES

Illustrative examples of the technologies disclosed herein are provided below. An embodiment of the technologies may include any one or more, and any combination of, the examples described below.

Example 1 includes a system comprising a rack, wherein the rack includes a plurality of sled spaces and a plurality of sleds, and wherein each sled is mounted in a corresponding sled space such that the plurality of sleds are spaced from one another in a vertical direction; and a robot, wherein the robot includes a sled table that is movable along the rack in the vertical direction to interface with one of the plurality of sleds, and wherein the sled table is supported by the rack when the sled table moves along the rack in the vertical direction.

Example 2 includes the subject matter of Example 1, and wherein the rack includes a plurality of spines that are spaced from one another such that the plurality of spines cooperate to at least partially define the plurality of sled spaces, and wherein each of the plurality of spines includes a guide track that is formed to include a plurality of indexing slots.

Example 3 includes the subject matter of any of Examples 1 and 2, and wherein the guide tracks of adjacent spines of the plurality of spines are spaced apart to define openings into the plurality of sled spaces through which sleds mounted in the sled spaces may be removed during operation of the system.

Example 4 includes the subject matter of any of Examples 1-3, and wherein the guide tracks of the plurality of spines extend from a lowermost sled space of the plurality of sled spaces in the vertical direction to an uppermost sled space of the plurality of sled spaces in the vertical direction.

Example 5 includes the subject matter of any of Examples 1-4, and wherein the indexing slots formed in each guide track extend from a sled space of the plurality of sled spaces that is located adjacent the lowermost sled space in the vertical direction to the uppermost sled space.

Example 6 includes the subject matter of any of Examples 1-5, and wherein the sled table includes a plurality of gears to interact with the plurality of indexing slots to facilitate movement of the robot along the rack in the vertical direction, and wherein each of the plurality of gears interacts with the plurality of indexing slots formed in one of the spines when the robot moves along the rack in the vertical direction.

Example 7 includes the subject matter of any of Examples 1-6, and wherein each of the plurality of gears is a helical gear, and wherein each of the plurality of indexing slots is shaped to interact with one of the plurality of helical gears.

Example 8 includes the subject matter of any of Examples 1-7, and wherein each of the plurality of gears is movable relative to a corresponding guide track between (i) a disengaged position, in which gear teeth of each gear are spaced from the corresponding guide track to resist interaction of the gear teeth with the plurality of indexing slots formed in the corresponding guide track, and (ii) an engaged position, in which the gear teeth are in contact with the corresponding guide track to enable interaction of the gear teeth with the plurality of indexing slots formed in the corresponding guide track.

Example 9 includes the subject matter of any of Examples 1-8, and wherein when the robot moves along the rack in the vertical direction, each of the plurality of gears is in the engaged position.

Example 10 includes the subject matter of any of Examples 1-9, and wherein the sled table includes a rake that is movable relative to the rack (i) into any of the plurality of sled spaces to retrieve one of the plurality of sleds mounted in a corresponding sled space from the sled space and (ii) out of any of the plurality of sled spaces to remove a sled mounted in a corresponding sled space from the sled space.

Example 11 includes the subject matter of any of Examples 1-10, and wherein the sled table includes a plurality of fingers coupled to the rake and each movable relative thereto between (i) a stowed position, in which each of the plurality of fingers extends along the rake in a horizontal direction without extending outwardly from the rake in the vertical direction, and (ii) a deployed position, in which each of the plurality of fingers extends outwardly from the rake in the vertical direction.

Example 12 includes the subject matter of any of Examples 1-11, and wherein each of the plurality of fingers is sized to be received by a corresponding handle of any of the plurality of sleds mounted in a corresponding sled space to facilitate retrieval of, and removal from, any of the plurality of sleds from the corresponding sled space when each of the plurality of fingers is in the deployed position.

Example 13 includes a rack for operation in a data center, the rack comprising a plurality of support posts extending vertically; and a plurality of spines extending vertically, wherein each spine is mounted to a corresponding support post such that each spine extends outwardly from the corresponding support post along a first direction, wherein each spine includes a guide track that defines an outermost edge of the spine along the first direction, and wherein each guide track includes a plurality of indexing slots to interface with gear teeth.

Example 14 includes the subject matter of Example 13, and wherein the plurality of spines are spaced from one another to at least partially define a plurality of sled spaces that are vertically spaced from one another and sized to receive a plurality of sleds, and wherein each guide track extends from a vertically-lowermost sled space of the plurality of sled spaces to a vertically-uppermost sled space of the plurality of sled spaces.

Example 15 includes the subject matter of any of Examples 13 and 14, and wherein the indexing slots of each guide track extend from a sled space of the plurality of sled spaces that is located adjacent the lowermost sled space in the vertical direction to the uppermost sled space.

Example 16 includes the subject matter of any of Examples 13-15, and wherein a vertically-uppermost point of each of the plurality of indexing slots is vertically spaced from a vertically-uppermost point of an adjacent one of the plurality of indexing slots.

Example 17 includes the subject matter of any of Examples 13-16, and wherein each guide track is formed to include a docking aperture that is located vertically below the plurality of indexing slots of each guide track.

Example 18 includes a robot for use with a rack of a data center, the robot comprising a cart movable along a support surface; and a sled table coupled to the cart, wherein the sled table is movable relative to the cart in a vertical direction between (i) a contacted position, in which the sled table is in contact with the cart such that the sled table is supported by the cart, and a detached position, in which the sled table is vertically spaced from the cart such that the sled table is unsupported by the cart.

Example 19 includes the subject matter of Example 18, and further including an umbilical cable that mechanically couples the sled table to the cart when the sled table is moved relative to the cart between the contacted position and the detached position, wherein the umbilical cable is retractable toward the cart to facilitate movement of the sled table relative to the cart between the contacted position and the detached position.

Example 20 includes the subject matter of any of Examples 18 and 19, and wherein the umbilical cable electrically couples the sled table to the cart when the sled table is moved relative to the cart between the contacted position and the detached position to provide electrical power to the sled table during operation of the robot.

Example 21 includes the subject matter of any of Examples 18-20, and wherein the sled table includes a plurality of gears to interact with a rack to facilitate movement of the sled table along the rack in the vertical direction.

Example 22 includes the subject matter of any of Examples 18-21, and wherein the sled table includes a plurality of rollers to contact the rack to facilitate movement of the sled table along the rack in the vertical direction, and wherein each of the plurality of gears is movable relative to at least one of the plurality of rollers between (i) a disengaged position, in which each of the plurality of gears is spaced apart from the at least one of the plurality of rollers in a horizontal direction, and (ii) an engaged position, in which each of the plurality of gears is aligned with the at least one of the plurality of rollers in the horizontal direction.

Example 23 includes a method of removing a sled installed in a rack of a data center, the method comprising moving a robot relative to the rack to a parked position in which the robot is located in close proximity to the rack; docking a sled table of the robot with the rack so that the sled table is coupled to the rack; and advancing the sled table of the robot along guide tracks of the rack in a vertical direction so that the sled table is supported by the rack.

Example 24 includes the subject matter of Example 23, and wherein docking the sled table of the robot with the rack comprises positioning a plurality of locating fasteners of the sled table in docking apertures formed in the rack to locate the robot relative to the rack.

Example 25 includes the subject matter of any of Examples 23 and 24, and further including removing the sled from the rack by a rake of the sled table when the sled table is supported by the rack.

The invention claimed is:

1. A system comprising:
   a rack, wherein the rack includes a plurality of sled spaces and a plurality of sleds, and wherein each sled is mounted in a corresponding sled space such that the plurality of sleds are spaced from one another in a vertical direction; and
   a robot, wherein the robot includes a sled table that is movable along the rack in the vertical direction to interface with one of the plurality of sleds, wherein the sled table is supported by the rack when the sled table moves along the rack in the vertical direction,
   and wherein the sled table includes a rake that is movable relative to the rack (i) into any of the plurality of sled spaces to retrieve one of the plurality of sleds mounted in a corresponding sled space from the sled space and (ii) out of any of the plurality of sled spaces to remove a sled mounted in a corresponding sled space from the sled space.

2. The system of claim 1, wherein the sled table includes a plurality of fingers coupled to the rake and each movable relative thereto between (i) a stowed position, in which each of the plurality of fingers extends along the rake in a horizontal direction without extending outwardly from the rake in the vertical direction, and (ii) a deployed position, in which each of the plurality of fingers extends outwardly from the rake in the vertical direction.

3. The system of claim 2, wherein each of the plurality of fingers is sized to be received by a corresponding handle of any of the plurality of sleds mounted in a corresponding sled space to facilitate retrieval of, and removal from, any of the plurality of sleds from the corresponding sled space when each of the plurality of fingers is in the deployed position.

4. The system of claim 1, wherein the rack includes a plurality of spines that are spaced from one another such that the plurality of spines cooperate to at least partially define the plurality of sled spaces, and wherein each of the plurality of spines includes a guide track that is formed to include a plurality of indexing slots.

5. The system of claim 4, wherein the guide tracks of adjacent spines of the plurality of spines are spaced apart to define openings into the plurality of sled spaces through which sleds mounted in the sled spaces may be removed during operation of the system.

6. The system of claim 5, wherein the guide tracks of the plurality of spines extend from a lowermost sled space of the plurality of sled spaces in the vertical direction to an uppermost sled space of the plurality of sled spaces in the vertical direction.

7. The system of claim 6, wherein the indexing slots formed in each guide track extend from a sled space of the plurality of sled spaces that is located adjacent the lowermost sled space in the vertical direction to the uppermost sled space.

8. The system of claim 4, wherein the sled table includes a plurality of gears to interact with the plurality of indexing slots to facilitate movement of the robot along the rack in the vertical direction, and wherein each of the plurality of gears interacts with the plurality of indexing slots formed in one of the spines when the robot moves along the rack in the vertical direction.

9. The system of claim 8, wherein each of the plurality of gears is a helical gear, and wherein each of the plurality of indexing slots is shaped to interact with one of the plurality of helical gears.

10. The system of claim 8, wherein each of the plurality of gears is movable relative to a corresponding guide track between (i) a disengaged position, in which gear teeth of each gear are spaced from the corresponding guide track to resist interaction of the gear teeth with the plurality of indexing slots formed in the corresponding guide track, and (ii) an engaged position, in which the gear teeth are in contact with the corresponding guide track to enable interaction of the gear teeth with the plurality of indexing slots formed in the corresponding guide track.

11. The system of claim 10, wherein when the robot moves along the rack in the vertical direction, each of the plurality of gears is in the engaged position.

12. A robot for use with a rack of a data center, the robot comprising:
    a cart movable along a support surface; and
    a sled table coupled to the cart, wherein the sled table is movable relative to the cart in a vertical direction between (i) a contacted position, in which the sled table is in contact with the cart such that the sled table is supported by the cart, and a detached position, in which the sled table is vertically spaced from the cart such that the sled table is unsupported by the cart.

13. The robot of claim 12, further comprising an umbilical cable that mechanically couples the sled table to the cart when the sled table is moved relative to the cart between the contacted position and the detached position, wherein the umbilical cable is retractable toward the cart to facilitate movement of the sled table relative to the cart between the contacted position and the detached position.

14. The robot of claim 13, wherein the umbilical cable electrically couples the sled table to the cart when the sled table is moved relative to the cart between the contacted position and the detached position to provide electrical power to the sled table during operation of the robot.

15. The robot of claim 12, wherein the sled table includes a plurality of gears to interact with a rack to facilitate movement of the sled table along the rack in the vertical direction.

16. The robot of claim 15, wherein the sled table includes a plurality of rollers to contact the rack to facilitate movement of the sled table along the rack in the vertical direction, and wherein each of the plurality of gears is movable relative to at least one of the plurality of rollers between (i) a disengaged position, in which each of the plurality of gears is spaced apart from the at least one of the plurality of rollers in a horizontal direction, and (ii) an engaged position, in which each of the plurality of gears is aligned with the at least one of the plurality of rollers in the horizontal direction.

17. A method of removing a sled installed in a rack of a data center, the method comprising:
    moving a robot relative to the rack to a parked position in which the robot is located in close proximity to the rack;
    docking a sled table of the robot with the rack so that the sled table is coupled to the rack;

advancing the sled table of the robot along guide tracks of the rack in a vertical direction so that the sled table is supported by the rack; and removing the sled from the rack by a rake of the sled table when the sled table is supported by the rack.

18. The method of claim 17, wherein docking the sled table of the robot with the rack comprises positioning a plurality of locating fasteners of the sled table in docking apertures formed in the rack to locate the robot relative to the rack.

19. A robot for use with a rack of a data center, the robot comprising:

a sled table that is movable along the rack in a vertical direction to interface with a sled stored in a sled space of the rack, wherein the sled table is supported by the rack when the sled table moves along the rack in the vertical direction, and wherein the sled table includes a rake movable relative to the rack into the sled space of the rack to retrieve the sled from the sled space.

20. The robot of claim 19, further comprising:

a cart, wherein the sled table is movable relative to the cart in a vertical direction between (i) a contacted position, in which the sled table is in contact with the cart such that the sled table is supported by the cart, and a detached position, in which the sled table is vertically spaced from the cart such that the sled table is unsupported by the cart; and an umbilical cable that mechanically couples the sled table to the cart when the sled table is moved relative to the cart between the contacted position and the detached position, wherein the umbilical cable is retractable toward the cart to facilitate movement of the sled table relative to the cart between the contacted position and the detached position.

21. The robot of claim 20, wherein the umbilical cable electrically couples the sled table to the cart when the sled table is moved relative to the cart between the contacted position and the detached position to provide electrical power to the sled table during operation of the robot.

22. The robot of claim 19, wherein the sled table includes a plurality of gears to interact with the rack to facilitate movement of the sled table along the rack in the vertical direction.

23. The robot of claim 22, wherein the sled table includes a plurality of rollers to contact the rack to facilitate movement of the sled table along the rack in the vertical direction, and wherein each of the plurality of gears is movable relative to at least one of the plurality of rollers between (i) a disengaged position, in which each of the plurality of gears is spaced apart from the at least one of the plurality of rollers in a horizontal direction, and (ii) an engaged position, in which each of the plurality of gears is aligned with the at least one of the plurality of rollers in the horizontal direction.

* * * * *